US007975475B2

(12) United States Patent
Ramun

(10) Patent No.: US 7,975,475 B2
(45) Date of Patent: Jul. 12, 2011

(54) UNIVERSAL CONTROL SCHEME FOR MOBILE HYDRAULIC EQUIPMENT AND METHOD FOR ACHIEVING THE SAME

(76) Inventor: John R. Ramun, Poland, OH (US)

( * ) Notice: Subject to any disclaimer, the term of this patent is extended or adjusted under 35 U.S.C. 154(b) by 747 days.

(21) Appl. No.: 11/728,969

(22) Filed: Mar. 27, 2007

(65) Prior Publication Data

US 2007/0220878 A1 Sep. 27, 2007

Related U.S. Application Data

(60) Provisional application No. 60/786,173, filed on Mar. 27, 2006.

(51) Int. Cl.
*F16D 31/02* (2006.01)

(52) U.S. Cl. ................................ 60/427; 60/484; 60/486

(58) Field of Classification Search .................... 60/420, 60/427, 484, 486; 74/471 XY
See application file for complete search history.

(56) References Cited

U.S. PATENT DOCUMENTS

| | | | | |
|---|---|---|---|---|
| 5,940,997 | A * | 8/1999 | Toyooka et al. | 37/411 |
| 6,854,554 | B2 * | 2/2005 | Brandt et al. | 74/471 XY |
| 6,994,284 | B1 * | 2/2006 | Ramun | 241/266 |
| 2006/0157605 | A1 | 7/2006 | Ramun et al. | |

FOREIGN PATENT DOCUMENTS

| | | | |
|---|---|---|---|
| EP | 0 900 889 | A | 3/1999 |
| EP | 1 178 157 | A | 2/2002 |
| EP | 1 260 716 | A1 | 11/2002 |
| JP | 04 312679 | A | 11/1992 |
| JP | 2000 199244 | A | 7/2000 |

* cited by examiner

*Primary Examiner* — Michael Leslie
(74) *Attorney, Agent, or Firm* — The Webb Law Firm

(57) ABSTRACT

A universal control scheme for mobile hydraulic equipment has switches to activate and/or control any number of different tools or accessories that may be used to configure the equipment. Additionally, a single controller command may be reassigned from one set to another set of hydraulic line pairs. Furthermore, at different times, two separate controller commands may be used to control the same hydraulic line pair. The subject invention is also directed to a method for achieving the same.

31 Claims, 21 Drawing Sheets

800

UNIVERSAL CONTROL SCHEME FOR MOBILE HYDRAULIC EQUIPMENT AND METHOD FOR ACHIEVING THE SAME

CROSS REFERENCE TO RELATED APPLICATIONS

This application claims the benefit of U.S. Provisional Application No. 60/786,173 filed Mar. 27, 2006.

BACKGROUND OF THE INVENTION

1. Field of the Invention

The present invention relates to a universal control scheme associated primarily with the hydraulic system for construction or demolition equipment, wherein the equipment is intended for use with hydraulic attachments such as a bucket, a cutting shear, a grapple, a hammer, a magnet or the like.

2. Description of Related Art

Throughout the application, reference will be made to construction equipment. However, the equipment is also referred to as demolition equipment, scrap handling equipment and the like. The description of construction equipment is not intended to be restrictive of the equipment being referenced. Construction equipment such as heavy-duty metal cutting shears, grapples and concrete crushers, have been mounted on backhoes powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates and the like must be efficiently severed and handled by heavy-duty metal shears.

However, typically such shears are detachably connected to the hydraulic cylinder such that, if the hydraulic cylinder is intended to be used for a different application, such as digging with a bucket, then the shears may be removed and the bucket may be attached to the hydraulic cylinder for the desired application.

FIG. 1 illustrates the hydraulics associated with a construction machine 10, such as a backhoe. In particular, the many functions of the backhoe are powered by hydraulic fluid, whereby an engine 12 operates hydraulic pumps 14 which take hydraulic fluid from a hydraulic tank 16 and provide it to a plurality of control valves 18. A plurality of hydraulic lines extend from the control valves 18 to different accessories and tools on the backhoe 10. In particular, a boom 20 pivotally attached to the base platform is operated by a boom hydraulic cylinder 24 powered by fluid from the control valves 18. In a similar fashion, a stick 26 and a bucket 28 are pivotally manipulated by associated hydraulic cylinders powered with fluid provided from one of the control valves 18. The platform 22 may be pivoted about the base 30 utilizing a hydraulic swing motor 32, again powered by hydraulic fluid supplied through one of the control valves 18. In general, the control valves 18 are operated within the backhoe cabin (not shown) by the use of two separate joysticks that may be pivoted in different directions and with buttons that may be associated with each of these joysticks.

Oftentimes, hydraulic equipment such as the backhoe illustrated in FIG. 1, may be reconfigured to perform different functions by substituting different parts of the backhoe.

In particular, FIG. 2 illustrates a construction machine 10 which has attached to the stick 26, a shear 35 for which the jaws 36, 38 open and close but, for which also the body 40 rotates about the shear axis 41. It should be appreciated that there is at least one additional function for the construction machine 10 illustrated in FIG. 2 beyond that shown for the construction machine illustrated in FIG. 1. In particular, the shear jaws 36, 38 are capable of opening and closing. Additionally, the body 40 is capable of rotating about its axis 41. Therefore, in order to configure the construction machine 10 illustrated in FIG. 1, it would be necessary to add an entire hydraulic circuit to control the hydraulic motor which would rotate the shear about its axis 41 or, which would open and close the jaws 36, 38, or both.

FIG. 3 illustrates a construction machine 10 which utilizes a grapple 44 attached to the stick 26 whereby, once again, the grapple 44 is capable of rotating about an axis 45 extending therethrough and, once again, a new hydraulic circuit would be required to power the hydraulic motor to rotate the grapple 44 about its axis 45 and/or to open and close the jaws of the grapple 44. The construction machine 10, as illustrated in FIGS. 1-3, utilizes a hydraulic motor to rotate the attachments about their axis. It should be appreciated that the control valve associated with this function is capable of reversing flow through the hydraulic motor so that the rotation of the tool may occur in either direction. Under these circumstances, the circuit that provides this function must include a control valve capable of reversing flow.

FIG. 4 illustrates a construction machine 10 having a hammer 47 attached to the stick 26. Once again, a separate hydraulic function is required to operate the hammer 47. However, unlike the previous configurations, the hammer 47 does not utilize a hydraulic motor capable of reversing, but only utilizes hydraulic fluid under pressure in a single direction to reciprocate the tip of the hammer. This requires the addition of yet another hydraulic line pair having associated therewith a hydraulic valve which does not reverse the flow because, under such circumstances, reversal is not needed.

FIG. 5 illustrates a construction machine 10 having an electric magnet 50 attached to the stick 26.

As can be appreciated, the reconfiguration of a single construction machine may be very involved and hydraulic line pairs used to operate accessories and equipment must be found at different locations on the construction machine 10.

FIG. 6 illustrates a schematic of a simple hydraulic system similar to that which may be associated with the construction machine 10 shown in FIG. 1.

To the extent that the construction machine 10 illustrated in FIG. 1 is designed for the sole purpose of manipulating a bucket 28, then the control valves 18 may be dedicated to particular hydraulic fluid lines, which themselves are dedicated to a particular function on the construction machine 10. In FIG. 6, the hydraulic tank 16 provides fluid to the pump 14 which supplies hydraulic lines 52, 54, 56 connected to associated control valves 58, 60, 62 to control the flow of hydraulic fluid to achieve different functions, for example, functions F1, F2, F3. Directing attention to FIG. 1, function F1 may be manipulating the hydraulic cylinder associated with the boom 20, function F2 may be controlling fluid to the hydraulic cylinder associated with the stick 26, while function F3 may be associated with providing hydraulic fluid to the cylinder which curls and extends the bucket 28. Nevertheless, when the function of each control valve 58, 60, 62 and the associated accessories/tools are determined, design of the hydraulic system to perform this task is relatively straightforward and a controller capable of selectively opening and closing each of the control valves 58, 60, 62 is also relatively simple.

With the expense associated with a construction machine 10, construction machine owners desire to maximize the flexibility of the construction machine 10, not only to alleviate the need to purchase multiple construction machines, but furthermore, to permit the machine owner to purchase a set of complete tools and accessories that may be used on a single construction machine 10.

Additionally, in the past and at best, when different construction machines 10 performed different functions, depending upon the manufacturer of the construction machine and the design of the controller for the control valves, the motion of the joysticks for example, could be different from manufacturer to manufacturer. As a result, the machine operator would be required to learn the protocol of each controller associated with each manufacturer's construction machine prior to using that machine even though the final function between two machines would be identical. This not only provides a substantial learning curve for each different machine, but furthermore, introduces an element of risk when a machine operator changes between different construction machines. A construction machine is needed with the versatility to accept any number of different accessories and/or tools and, furthermore, to provide a central controller capable of controlling each of these functions in a relatively uniform and logical fashion. This would permit a machine operator to learn a protocol associated with each operation, wherein such a protocol will be the same between different machines utilizing the same design.

SUMMARY OF THE INVENTION

A first embodiment of the subject invention is directed to a system for activating hydraulic circuits necessary for different functions on a construction machine having a hydraulic tank with fluid therein, a hydraulic pump for providing fluid to hydraulic supply lines, wherein each hydraulic supply line has a related hydraulic return line for returning the fluid to the hydraulic tank, thereby defining hydraulic line pairs, and wherein each pair of hydraulic lines ends at a terminal adapted to be connected to a hydraulically operated accessory, comprising:

a) at least two fixed-function hydraulic line pairs dedicated to providing fluid for predetermined machine functions;
b) a plurality of open-function hydraulic line pairs available for providing fluid for other machine functions, wherein one or more of these line pairs are each connected at their terminal to an accessory for operating that accessory and the remaining open-function hydraulic lines are not connected to an accessory;
c) a hydraulic control valve associated with each hydraulic line pair, wherein each control valve reverses the flow of hydraulic fluid between the first line and the second line of a hydraulic pair; and
d) a controller capable of selectively opening and closing each of the control valves associated with hydraulic line pairs thereby controlling fluid flow to the open-function hydraulic line pairs and to the fixed-function hydraulic line pairs.

A second embodiment of the subject invention is directed to a system for activating hydraulic circuits necessary for different functions on a construction machine having a hydraulic tank with fluid therein and a hydraulic pump for providing fluid to hydraulic supply lines, wherein each hydraulic supply line has a related hydraulic return line for returning the fluid to the hydraulic tank thereby defining hydraulic line pairs, comprising:

a) at least two fixed-function hydraulic line pairs dedicated to providing fluid for predetermined machine functions, wherein these hydraulic lines are always activated during system operation;
b) a plurality of open-function hydraulic line pairs available for providing fluid for other machine functions, wherein the open-function hydraulic line pairs end at terminals adapted to be connected to one or more hydraulically operated accessories;
c) a flow divider valve associated with one pair of open-function lines, wherein the flow divider valve is connected to an activated hydraulic line pair and is operable to divide the flow and supply fluid to both the fixed-function hydraulic line pairs and a hydraulic line pair associated with an accessory;
d) a hydraulic control valve associated with each of the remaining pairs of hydraulic lines;
e) a master for manipulating the flow divider valve to selectively activate the associated open-function hydraulic line pair for a specific accessory attached to the construction machine; and
f) a controller capable of selectively opening and closing all of the hydraulic control valves associated with the hydraulic lines thereby controlling the flow through activated hydraulic lines.

A third embodiment of the subject invention is directed to a system for activating hydraulic circuits necessary for different functions on a construction machine having a hydraulic tank with fluid therein, a hydraulic pump for providing fluid to hydraulic supply lines, wherein each hydraulic supply line has a related hydraulic return line for returning the fluid to the hydraulic tank thereby defining hydraulic line pairs and, wherein each pair of hydraulic lines ends at a terminal adapted to be connected to a hydraulically operated accessory, wherein the accessory is attached to the machine, comprising:

a) at least two fixed-function hydraulic lines dedicated to providing fluid for predetermined machine functions, wherein these hydraulic lines are always activated during system operation;
b) a plurality of open-function hydraulic line pairs available for providing fluid for other machine functions, wherein one or more of these line pairs are each connected at their terminal to an accessory to operate that accessory;
c) a hydraulic control valve associated with at least one hydraulic line pair;
d) a flow diverter valve for diverting the flow from a pair of feeder hydraulic lines, wherein in a first position, the valve directs flow to a first pair of branch hydraulic lines and, in a second position, the valve directs flow to a second pair of branch hydraulic lines, with each pair of branch hydraulic lines adapted to receive an accessory attached thereto, wherein the control valve associated with the pair of feeder hydraulic lines is positioned between the flow diverter valve and the pump, and wherein the control valve reverses the flow of hydraulic fluid between the first line and the second line of a hydraulic pair;
e) a master which positions the flow diverter valve to direct fluid to one of the two branch hydraulic lines; and
f) a controller which, for a particular motion or force imparted to it, opens and closes a particular control valve.

A fourth embodiment of the subject invention is directed to a system for activating hydraulic circuits necessary for different functions on a construction machine having a hydraulic tank with fluid therein, a hydraulic pump for providing fluid to hydraulic supply lines, wherein each hydraulic supply line has a related hydraulic return line for returning the fluid to the hydraulic tank thereby defining hydraulic line pairs and, wherein each pair of hydraulic lines ends at a terminal adapted to be connected to a hydraulically operated accessory, wherein the accessory is attached to the machine, comprising:

a) at least two fixed-function hydraulic lines dedicated to providing fluid for predetermined machine functions, wherein these hydraulic lines are always activated during system operation;

b) a plurality of open-function hydraulic line pairs available for providing fluid for other machine functions, wherein one or more of these line pairs are each connected at their terminal to an accessory to operate that accessory;

c) a control valve associated with each pair of hydraulic lines, wherein each control valve is between the pump and the terminal end, and wherein each control valve reverses the flow of hydraulic fluid between the first line and the second line of a hydraulic pair;

d) a flow diverter valve for directing the flow from one pair of feeder hydraulic lines to one of two pairs of branch hydraulic lines, wherein in a first position, the flow diverter valve directs flow from a first pair of feeder hydraulic lines to the pair of branch lines and, in a second position, the flow diverter valve directs flow from a second pair of feeder hydraulic lines to the pair of branch lines, wherein each pair of branch lines has an accessory attached thereto;

e) a master which, in a first position, positions the flow diverter valve to direct fluid from the first one of the two feeder hydraulic lines to the branch hydraulic lines and, in a second position, positions the flow diverter valve to direct fluid from the second one of the two feeder hydraulic lines to the branch hydraulic lines; and f) a controller which, with the master in the first position, for a particular motion or force imparted to the controller, controls fluid in the branch hydraulic lines and, with the master in the second position, for a different motion or force imparted to the controller, controls fluid in the same branch hydraulic line.

A fifth embodiment of the subject invention is directed to a hydraulic system for a construction machine having a platform rotationally mounted about a base, a boom pivotally attached to the platform, and at least one additional member attached to the boom for performing work, comprising:

a) pressurized hydraulic fluid;

b) a controller, wherein a distinct command from the controller is associated with a particular task and operates a hydraulic valve to direct the pressurized hydraulic fluid through a hydraulic line to a first hydraulic terminal which controls a movement of the platform, boom or member attached thereto; and c) a flow diverter valve in the hydraulic line downstream of the hydraulic valve to redirect the hydraulic fluid to a second hydraulic terminal thereby reassigning the distinct command of the controller to a different task.

With each of these apparatus embodiments is an associated method embodiment.

DETAILED DESCRIPTION OF THE INVENTION

Figure 1:
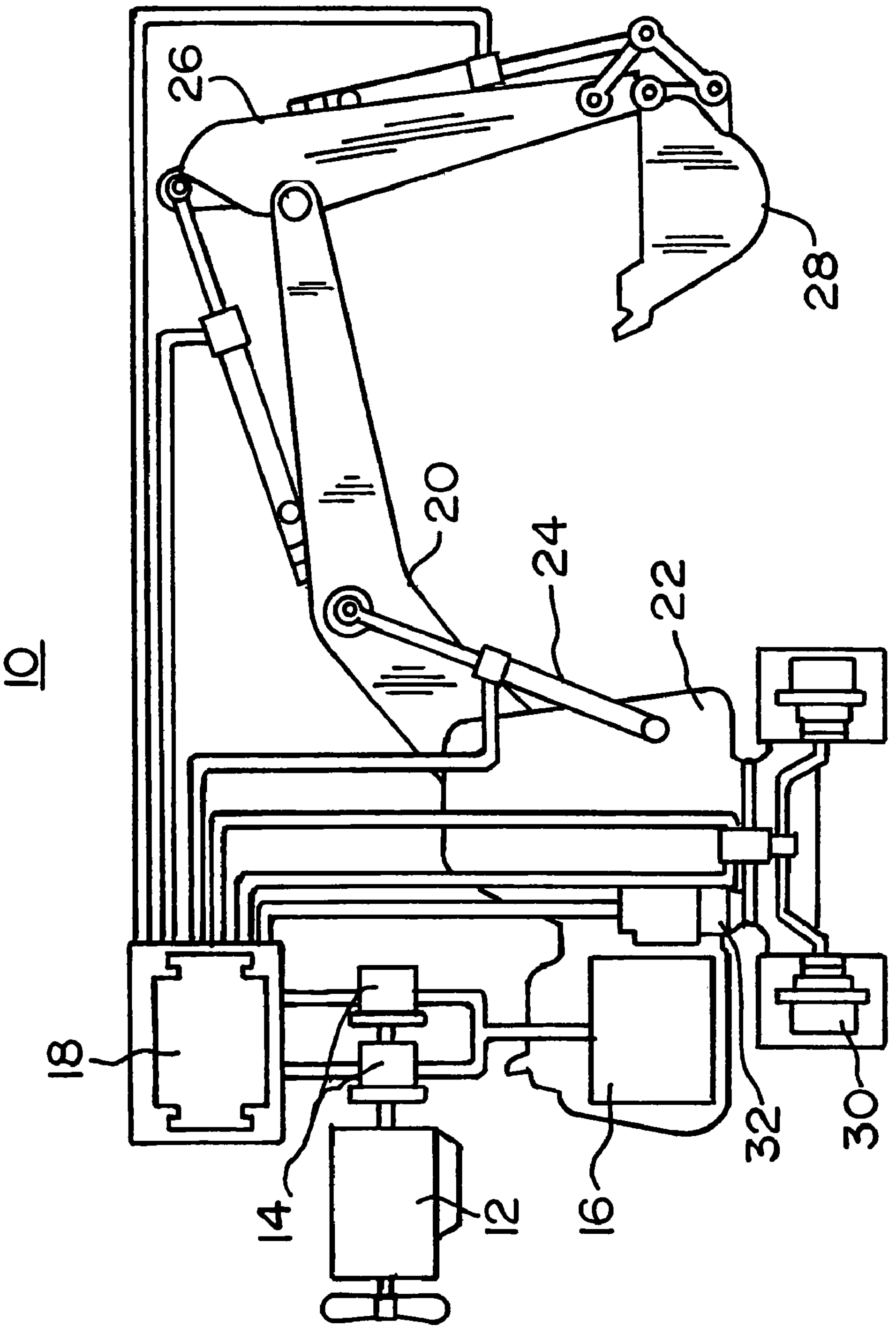
FIG. 1 PRIOR ART
FIG. 1 is prior art and is a sketch of a construction machine used for manipulating a bucket.
Figure 7:
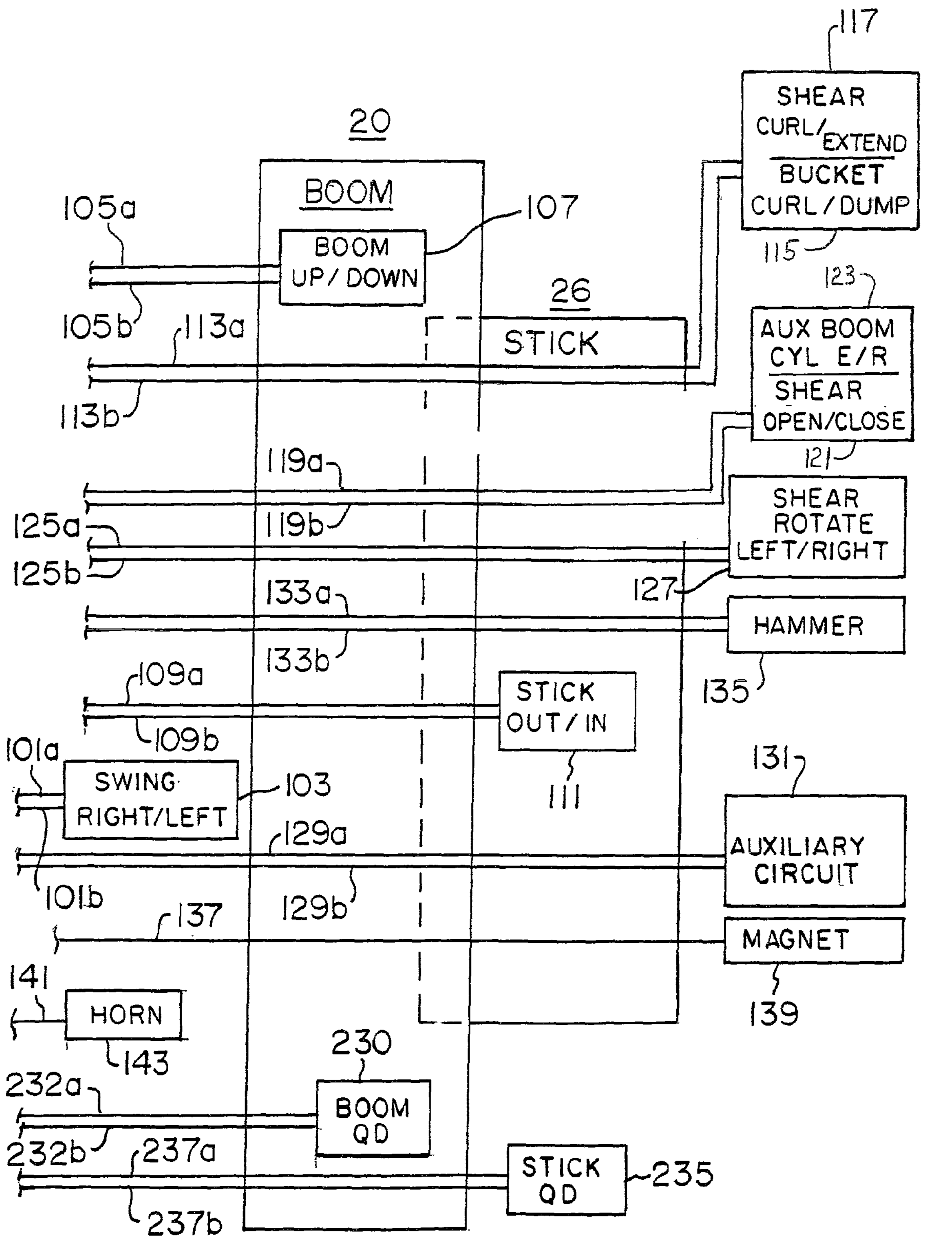
FIG. 7 is a sketch of typical hydraulic lines that may be associated with a construction machine in accordance with the subject invention.

From inspection of FIG. 1, it should be appreciated that the hydraulic line powering the accessories and tools of a construction machine 10 must be able to provide pressurized fluid to many different locations on the construction machine 10. Briefly stated, the hydraulic lines associated with the boom 20 terminate at the hydraulic cylinder 24 controlling the boom 20, the hydraulic lines feeding the cylinder controlling the stick 26 terminate at a different location, and the hydraulic lines to the cylinder controlling the bucket 28 terminate at a different location. In accordance with the subject invention, numerous pairs of hydraulic lines are positioned throughout the construction machine 10 and at locations that will be suitable for accessories and tools with many different configurations. In particular, what will be described in FIG. 7 are hydraulic lines for a number of custom configurations, but it should be appreciated that this is only representative of these configurations and should not in any way limit the number of different configurations for which this subject invention may be applied.

Each pair of hydraulic lines will include a supply line (101*a*, for example) provided from the hydraulic pump (not shown) and a return line (10*b*, for example) which flows into the hydraulic tank (not shown). For ease in identification, the supply lines will be a reference number with an "a" suffix while the return lines will be the same return lines with a "b" suffix. The hydraulic arrangement illustrated in FIG. 7 may be used, for example, with each of the construction machines 10 illustrated in FIGS. 1-5 without the need to add additional hydraulic lines or without the need to physically modify the controller which operates the hydraulic control valves.

The hydraulic line pair 101*a*, 101*b* is used to control the swing function whereby, with attention given to FIG. 1, the platform 22 pivots, or swings, about the base 30.

The hydraulic line pair 105*a*, 105*b* is associated with the hydraulic cylinder attached to the boom 20 to move the boom up and down for boom up/down function 107.

The hydraulic line pair 109*a*, 109*b* is used to control the hydraulic cylinder associated with the stick 26 to move the stick 26 out and in for the stick out/in function 111.

The hydraulic line pair 113*a*, 113*b* is used to control the hydraulic cylinder attached to the bucket 28 for the bucket curl/dump function 115. It should be noted that the same hydraulic line pair 113*a*, 113*b* may also be utilized with the arrangement illustrated in FIG. 2 to curl and extend the shear 35. Note at this time, that even though the bucket curl/dump function 115 and the shear curl/extend function 117 utilize the same hydraulic line pair 113*a*, 113*b*, with the embodiment illustrated herein, each will require a distinct controller motion for activation. Worded differently, a joystick motion will be utilized to activate the bucket curl/dump function 115 while a button on a pistol grip will be utilized to activate the shear curl/extend function 117.

The hydraulic line pair 119*a*, 119*b* is used to control the hydraulic cylinder associated with the shear 35 for the shear open/close function 121. Additionally, the same hydraulic line pair 119*a*, 119*b* may be utilized to control the hydraulic cylinder mounted upon the boom 24 and to provide an auxiliary boom extend/retract function 123 to control an accessory or tool attached to the boom 24. Once again it should be noted, that the same hydraulic line pair 119*a*, 119*b* is used to control both the shear open/close function 121 and the auxiliary boom cylinder extension/retraction function 123. However, as it will be explained in more detail, each of these functions will be performed by a different motion of the controller. In particular, the shear open/close function 121 will be controlled by the lateral motion of the right side joystick while the auxiliary boom cylinder extension/retraction 123 will be controlled by a button on the pistol grip of the left joystick.

The hydraulic line pair 125*a*, 125*b* is used to control the shear rotation function 127 for the shear 35.

The hydraulic line pair 129*a*, 129*b* is used for auxiliary hydraulic lines at the stick 26 for other functions, as needed. Such other functions are identified by auxiliary circuit 131.

The hydraulic line pair 133*a*, 133*b* is used to control the hammer 47 (FIG. 4) through the hammer function 135.

As previously mentioned, the construction machine 10 may have a magnet attached thereto and an electrical line 137 extends along the frame of the construction machine 10 to reach the magnet 50 (FIG. 5) to provide a magnet function 139. Finally, an electrical line 141 extends to the horn (not shown) to provide a horn function 143.

In FIG. 7, the general outline of the boom 20 and stick 26 is provided to give an indication of where each pair of hydraulic lines is connected to an accessory or tool.

Figure 8:
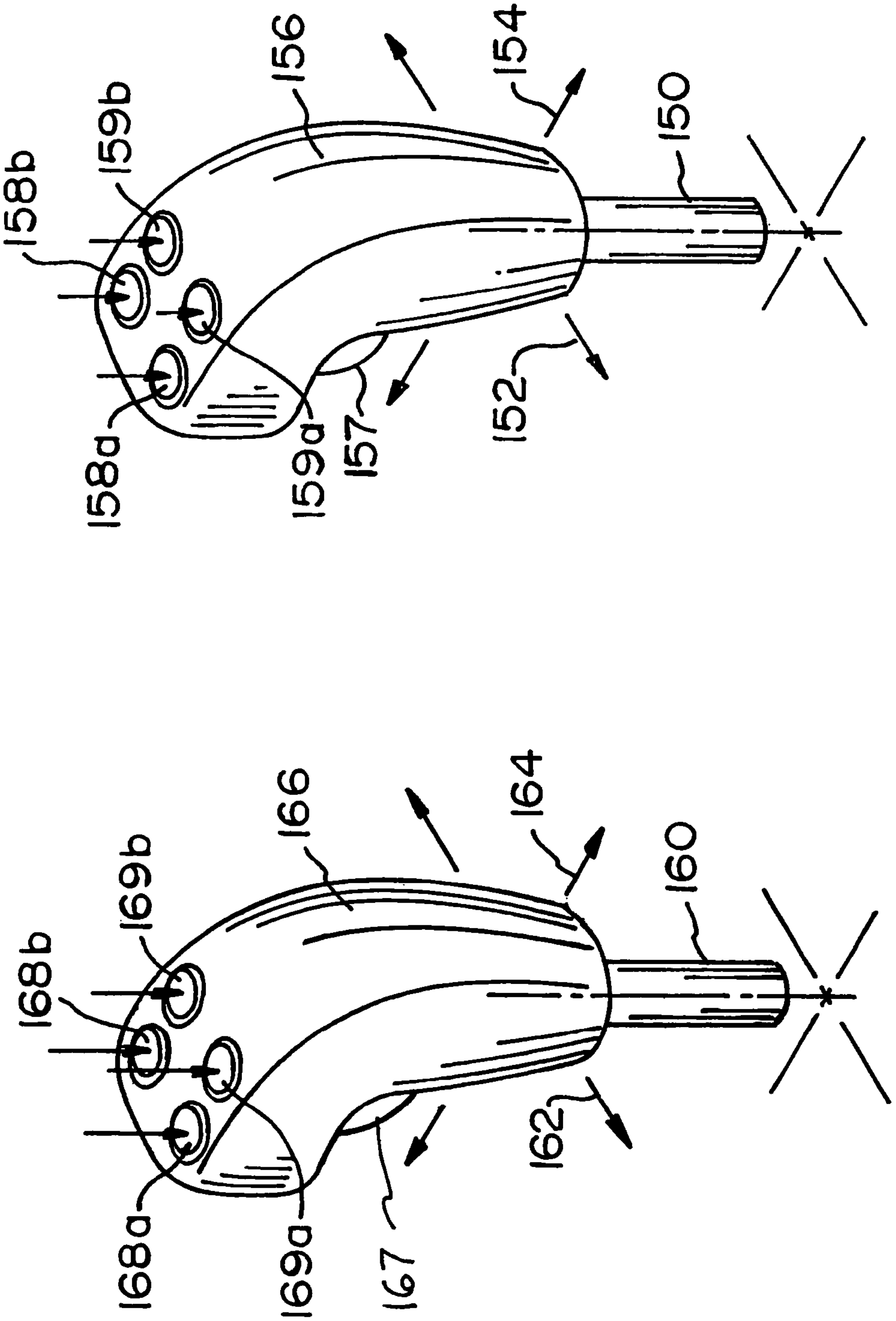
FIG. 8 is a sketch of two joysticks each with a pistol grip associated therewith, used as controllers for the hydraulic valves of a construction machine.

As previously mentioned, it is typical for hydraulically operated construction machines 10 to have joysticks with pistol grips attached thereto for controlling the multiple functions of a construction machine 10. FIG. 8 illustrates the right joystick 150 capable of reciprocating lateral motion indicated by arrow 152 in one direction and reciprocal lateral motion in an orthogonal direction indicated by arrow 154. Attached to the right joystick 150 is a pistol grip 156 having mounted thereupon four control buttons 158*a*, 158*b*, 159*a*, 159*b*. Each pair 158*a*, 158*b*, 159*a*, 159*b* is intended to control a separate function and each button within a pair to provide fluid for that function in one direction or another.

It should be noted that the reciprocating lateral motion indicated by arrow 152 of the joystick 150 and the reciprocating lateral motion indicated by arrow 154 are each intended to control a single function, but to provide a forward and reverse direction depending upon the position of the joystick 150.

Directing attention to the left hand joystick, the description of the lateral motion of the joystick 160 is identical to that as previously described with respect to joystick 150 and, for convenience, the identical directions of the joystick identified by reference numbers incremented by ten, i.e., reference number 162 in joystick 160 is equivalent to reference number 152 in joystick 150, and the like. Likewise, the operation of the buttons on the pistol grip 166 are similar to those on pistol grip 156 and, as a result, have been identified with reference numbers incremented by ten, i.e., 168*a*, 168*b*, 169*a* and 169*b* (similar to 158*a*, 159*b*, 159*a* and 159*b*). The buttons 158*a*, 158*b*, 159*a*, 159*b*, 168*a*, 168*b*, 169*a*, 169*b* on each pistol grip 156, 166 are essentially controller on/off switches, which produce commands that may operate the hydraulic control valves.

Additionally, pistol grip 156 includes a hammer trigger 157 intended to function to provide hydraulic fluid to the hammer, while trigger 167 in the left pistol grip 166 is intended to act as a switch to provide electricity to the horn.

Figure 9:
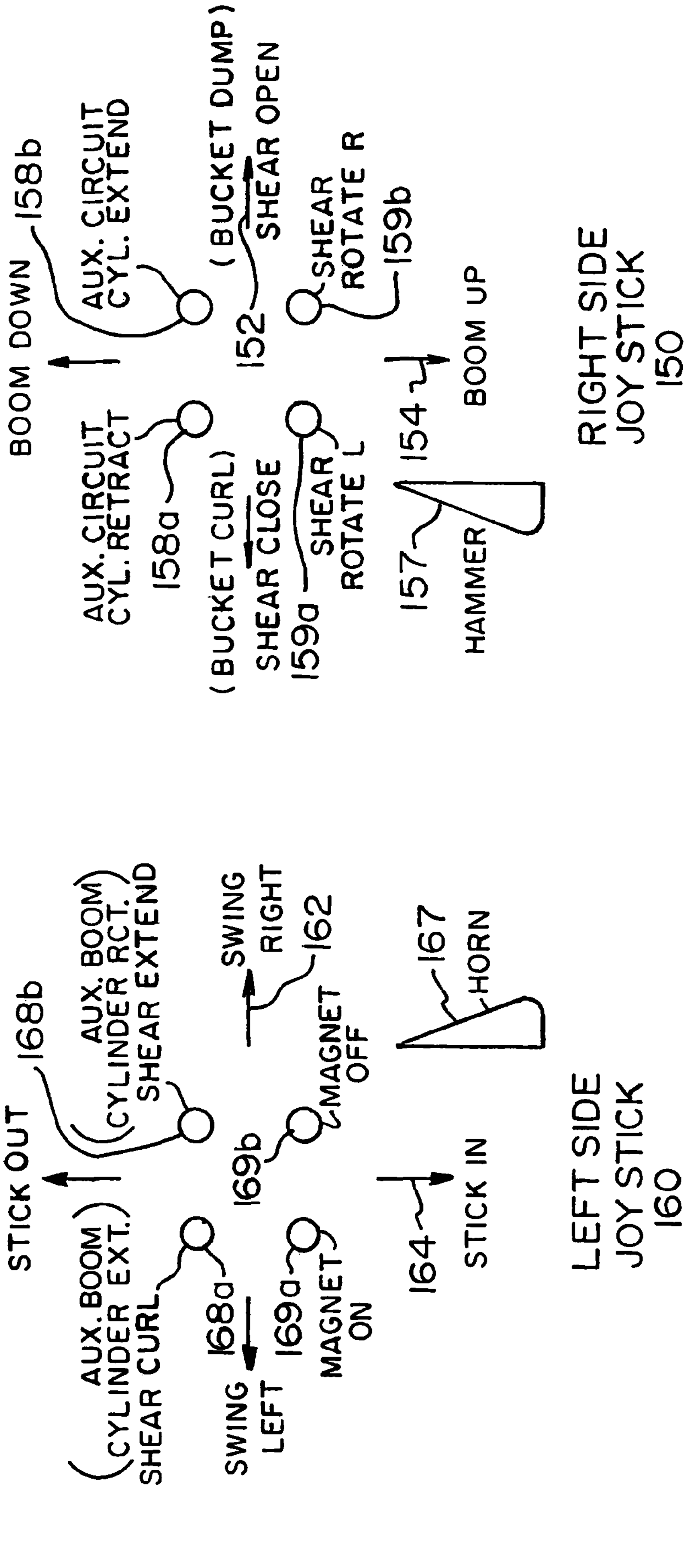
FIG. 9 is a sketch illustrating the function of the joysticks and pistol grips illustrated in FIG. 8.

FIG. 9 is a schematic of the function of the right side joystick 150 and associated pistol grip 156 and left side joystick 160 and associated pistol grip 166 found in FIG. 8. The reference numerals associated with the joystick motion and the buttons of the pistol grips are also found in FIG. 9. It should be noted that certain activation motions of the joystick/pistol grip control two separate functions. In particular, motion of the right side joystick 150 in the direction 152 (FIG. 8) in one instance opens and closes the shear that may be mounted to the boom 20 or the stick 26 and, in the other instance, this motion operates the function to curl or dump the bucket 28. On the other hand, directing attention to the left side joystick 160, activation of buttons 168*a*, 168*b*, in one instance, operates to curl or extend the shear 135 while, in another instance, operates to extend or retract the auxiliary boom cylinder. It should be appreciated that the hydraulic lines 119*a*, 119*b* used to extend or retract the auxiliary boom cylinder may be used for any available function.

This is a very important feature of the subject invention. There are certain stick/pistol grip activation motions that machine operators generally associate with certain functions on the construction machine. In particular, when a bucket 28 is mounted upon the construction machine 10, the machine operator expects to curl and dump the bucket by lateral motion of the right side joystick in the direction 152. Additionally, when a shear is mounted upon the construction machine, the machine operator expects that same motion of the right side joystick to open and close the jaws of the shear. If the joystick motion was only associated with a single function, such a reassignment would be impossible. Through the subject invention, the inventor has arrived at a design whereby, through the flip of a switch on a master control panel, the function of these controls may be changed.

Directing attention to the left side joystick 160 and to buttons 168*a*, 168*b*, once again, when a shear 35 is mounted upon a construction machine 10, the machine operator expects that these buttons 168*a*, 168*b* are available to curl and extend the shear 35. However, in the same manner, if there is not a shear 35 mounted upon the construction machine, the same buttons 168*a*, 168*b* may be utilized to extend an auxiliary cylinder associated with the boom 20.

Figure 10:
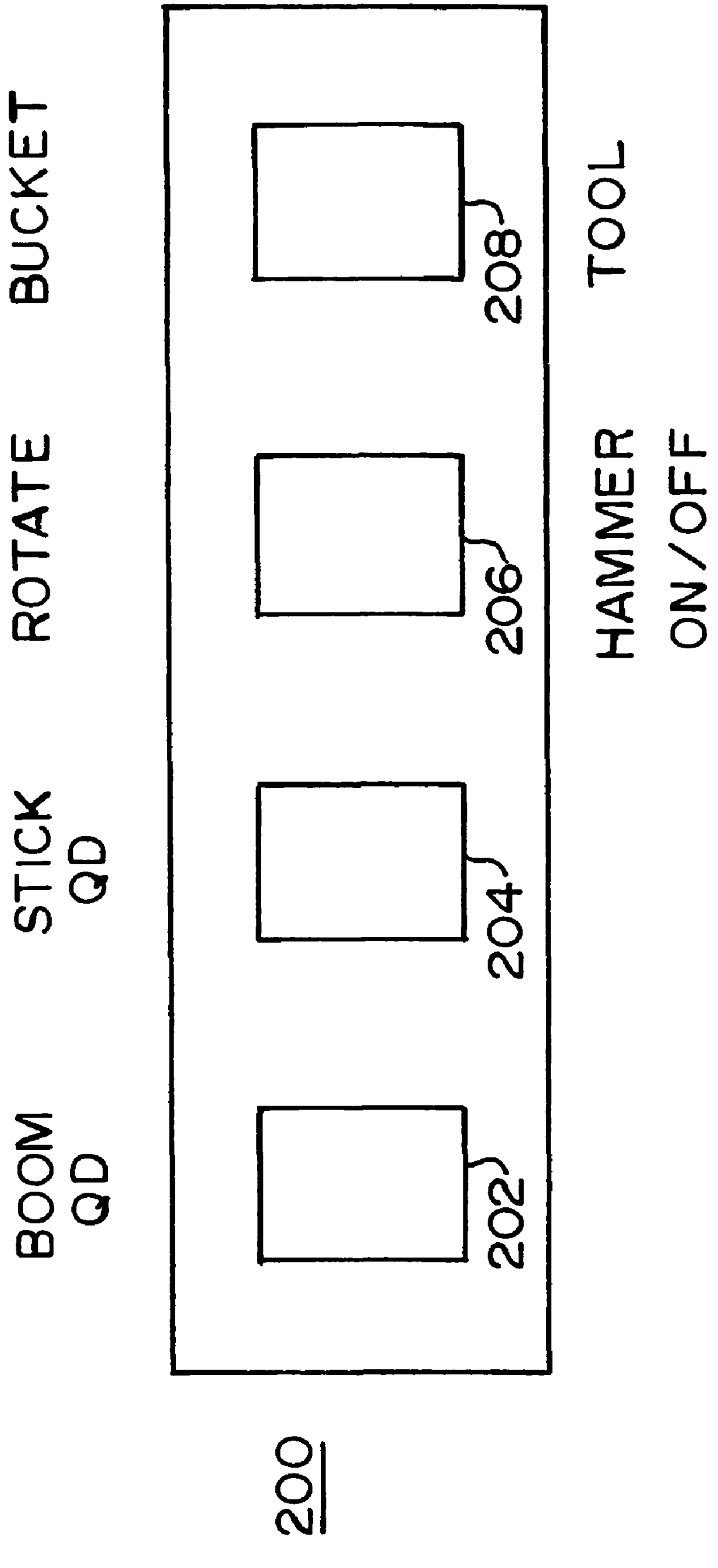
FIG. 10 is a sketch of a master controller utilized to reassign the function of different motions of the joysticks/pistol grip buttons for customization to a particular task.

Directing attention to FIG. 10, a master control panel 200 includes four separate toggle switches, the boom quick disconnect toggle switch 202, the stick quick disconnect toggle switch 204, a rotate/hammer toggle switch 206, and a bucket/tool toggle switch 208. The boom quick disconnect toggle switch 202 and the stick quick disconnect toggle switch 204 operate hydraulic lines associated with hydraulic couplings at the boom 20 and stick 26 for ease of removal of accessories attached thereto. Of particular interest in the subject invention, however, are the rotate/hammer toggle switch 206 and the bucket/tool toggle switch 208.

Figure 11:
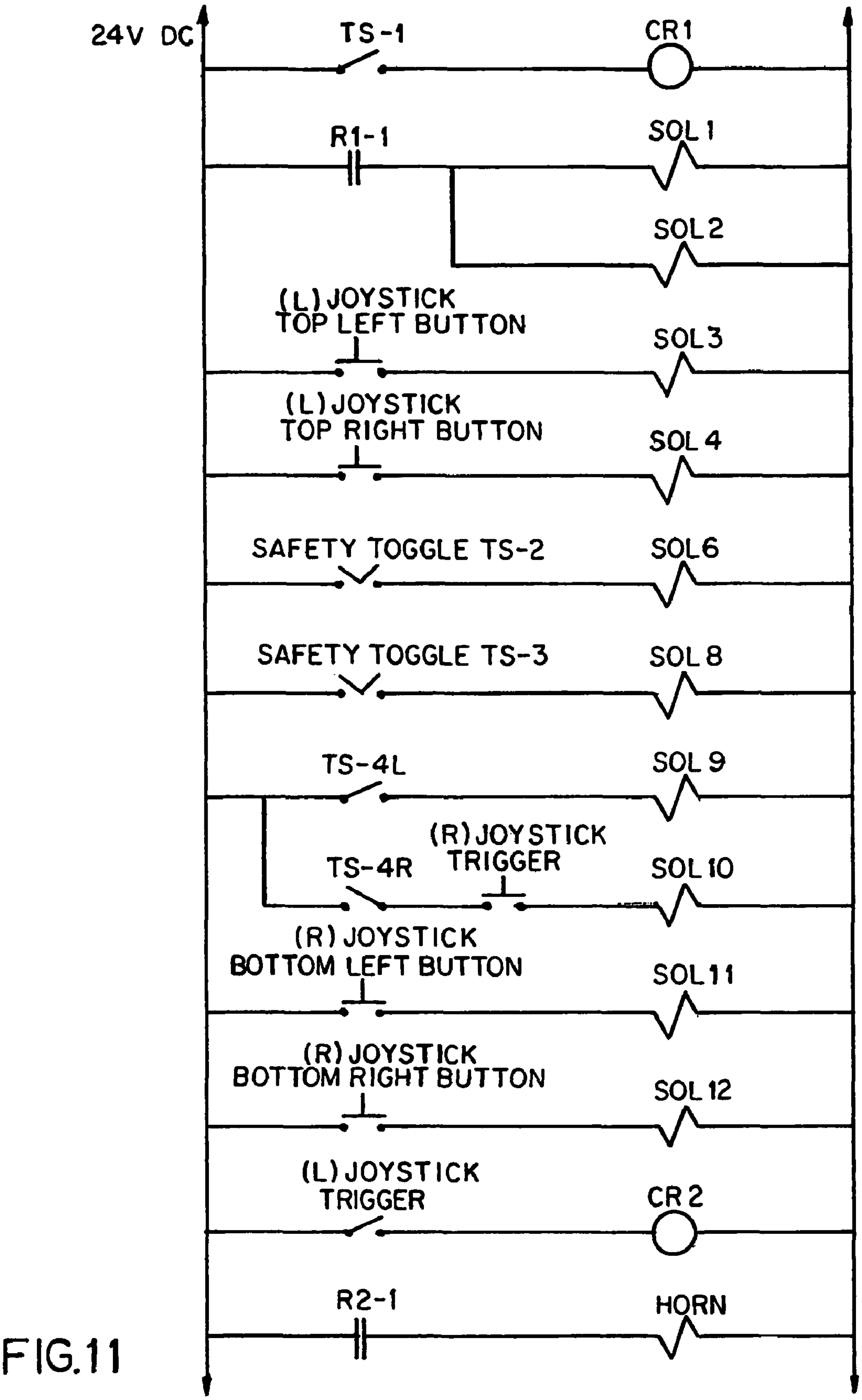
FIG. 11 is a sketch of the electric circuitry associated with controlling the hydraulic valves.
Figure 12:
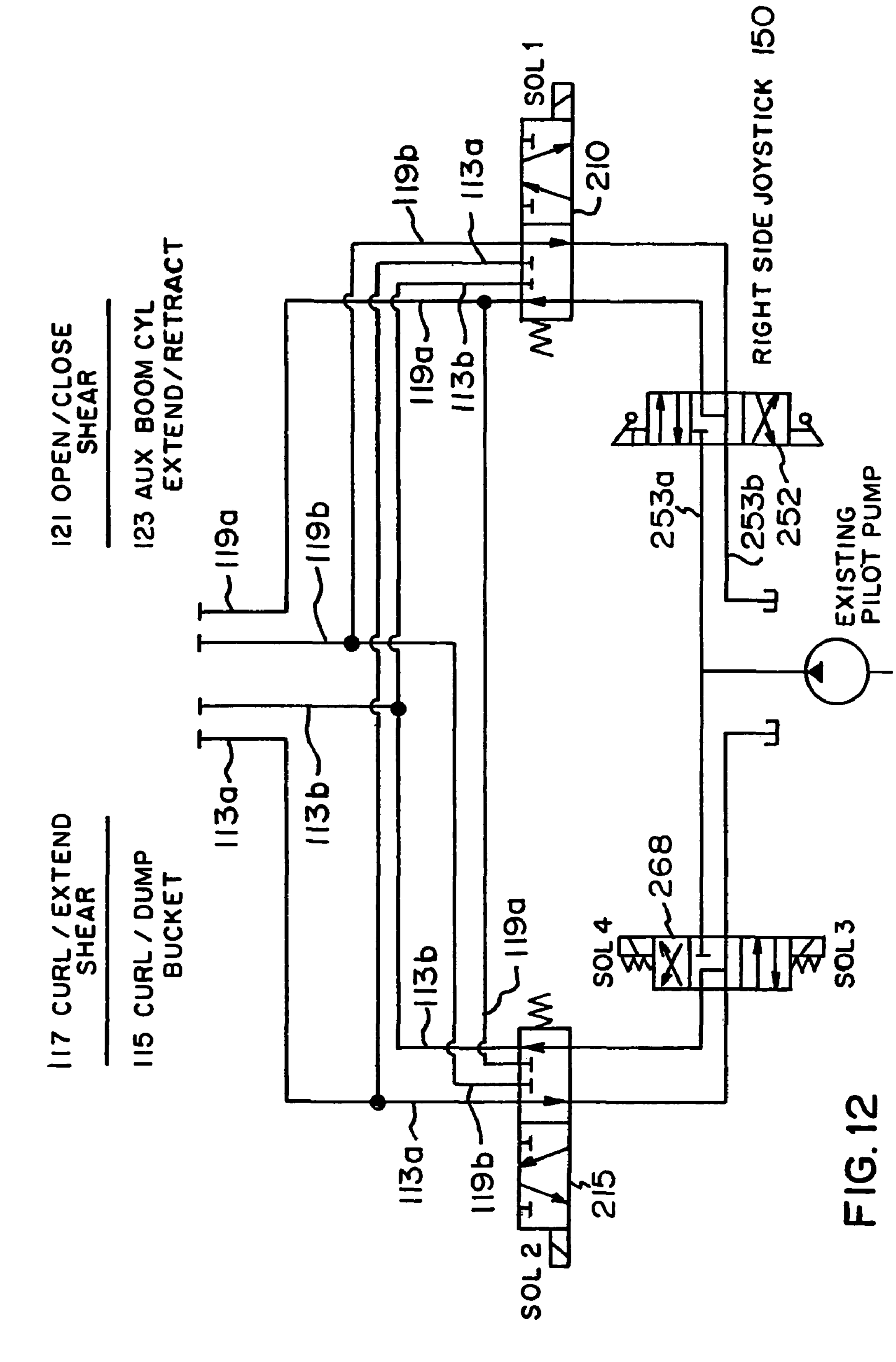
FIG. 12 is a hydraulic circuit associated with lateral motion of the right joystick and activation of buttons on the left pistol grip.

FIG. 11 illustrates the electronic circuitry of the system in accordance with the subject invention, while FIG. 12 illustrates the hydraulic circuitry associated with the bucket/tool toggle switch 208 in FIG. 10. Two modes of operation associated with the toggle switch 208 will now be described. In the first mode of operation, a shear 38 (FIG. 2) is secured to the stick 26 and, with the diverter valves 210, 215 in the biased positions, shown in FIG. 12, the hydraulic lines 113*a*, 113*b* are associated with the curl/extend shear function 117 while hydraulic lines 119*a*, 119*b* are associated with the open/close shear function 121. In the second mode of operation, a bucket 28 (FIG. 1) is secured to the stick 26 and with the diverter valves 210, 215 in the activated or un-biased positions opposite to those shown in FIG. 12, the hydraulic lines 113*a*, 113*b* are now associated with the bucket curl/dump function 115 while hydraulic lines 119*a*, 119*b* are associated with the auxiliary boom extend/retract function 123. This boom extend/retract function 123 may be another function utilizing hydraulic line pairs 119*a*, 119*b*. By using the bucket/tool toggle switch 208, the flow diverter valve 210 and the diverter valve 215 will change fluid flow from the first mode of operation activating the shear open/close function 121 using hydraulic line pairs 119*a*, 119*b* and activating the curl/extend shear functions 117 using hydraulic line pairs 113*a*, 113*b* to the second mode of operation activating the bucket curl/dump function 115 using hydraulic line pairs 113*a*, 113*b* and activating the auxiliary boom cylinder extend/retract functions 123 using hydraulic lines 119*a*, 119*b*. In particular and with attention given to FIG. 11, by activating the bucket/tool toggle switch 208 (TS-1) in the direction of the "tool" label as indicated in FIG. 10, then toggle switch TS-1 will remain open and solenoid SOL1 and solenoid SOL2 will not be energized so that the flow diverter valve 210 and the flow diverter valve 215 will remain in the biased position illustrated in FIG. 12. For example, in the first mode of operation, when the right side joystick 150 is moved in the lateral direction indicated by arrow 152 in FIG. 8, the control valve 252 will move back and forth from a straight flow to a reverse flow position, thereby providing fluid to perform the open/close shear function 121. It should be appreciated that the general description of "tool" on the master control panel 200 merely indicates that flow through hydraulic line pair 119*a*, 119*b* will be available for whatever tool or accessory is connected to those lines.

Furthermore, in the first mode of operation, the flow control valve operated by buttons 168*a*, 168*b* in the pistol grip 166 on the left joystick 160 close a circuit to activate solenoid SOL3 and solenoid SOL4 to position the control valve 268 to provide fluid through hydraulic line pairs 113*a*, 113*b* for the curl/extend shear function 117.

Under the circumstances, where the button/tool toggle switch 208 (TS-1) is moved in the direction of the "bucket" label, then toggle switch TS-1 (FIG. 11) will be closed and solenoid SOL1 and solenoid SOL2 will be energized, thereby operating the flow diverter valves 210, 215 to redirect flow. In particular, with the flow diverter valve 210 moved to a second position, fluid traveling past control valve 252 will now be redirected to hydraulic line pair 113*a*, 113*b* for the second mode of operation activating the bucket curl/dump function 115.

On the other hand, with flow diverter valve 215 displaced to its second position, fluid traveling through control valve 268 will be redirected to hydraulic line pair 119*a*, 119*b* for the second mode of operation and available for the auxiliary boom cylinder extend/retract functions 123.

It should be appreciated that what has just been described is the reassignment of the lateral motion 152 of the right side joystick 150 from the open/close shear function 121 (first mode of operation) to the curl/dump bucket function 115 (second mode of operation). At the same time, buttons 168*a*, 168*b* on the pistol grip 166 of the left hand joystick 160 has been reassigned from the shear curl/extend function 117 (first mode of operation) to the auxiliary cylinder boom extend/retract function 123 (second mode of operation), which may or may not be implemented with use of the curl/dump bucket function 115.

As a result of this design, the lateral motion in the direction 152 of the right side joystick 150 has been made available for two distinct functions which include the curl/dump bucket function 115 and the open/close shear function 121. Additionally, the activation of buttons 168*a*, 168*b* on the pistol grip 166 of the left hand joystick 160 have been made available from two distinct functions which include the shear curl/extend function 117 and the auxiliary cylinder boom extend/retract function 123.

Figure 2:
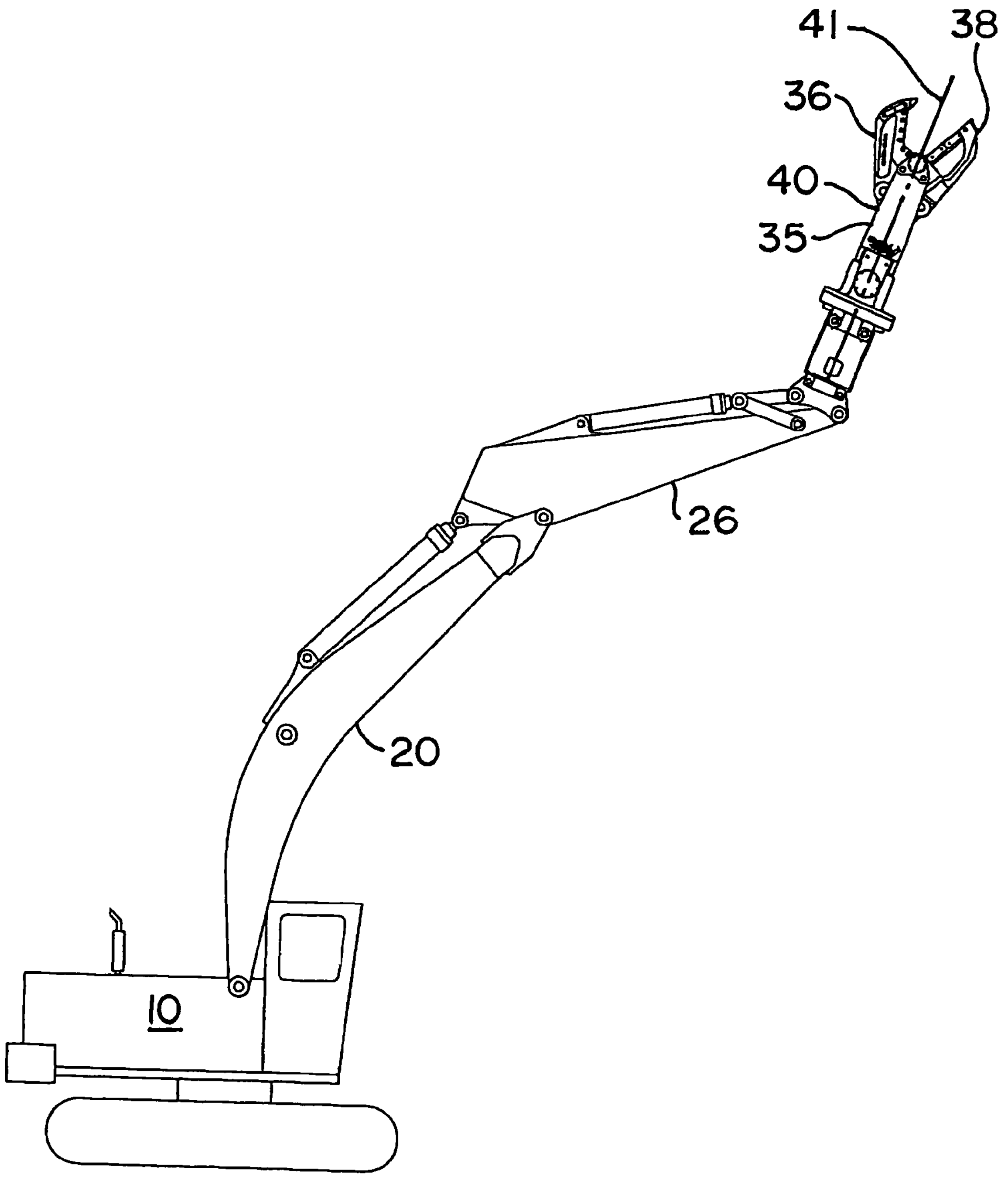
FIG. 2 PRIOR ART
FIG. 2 is prior art and is a sketch of a construction machine utilized for manipulating a shear.
Figure 3:
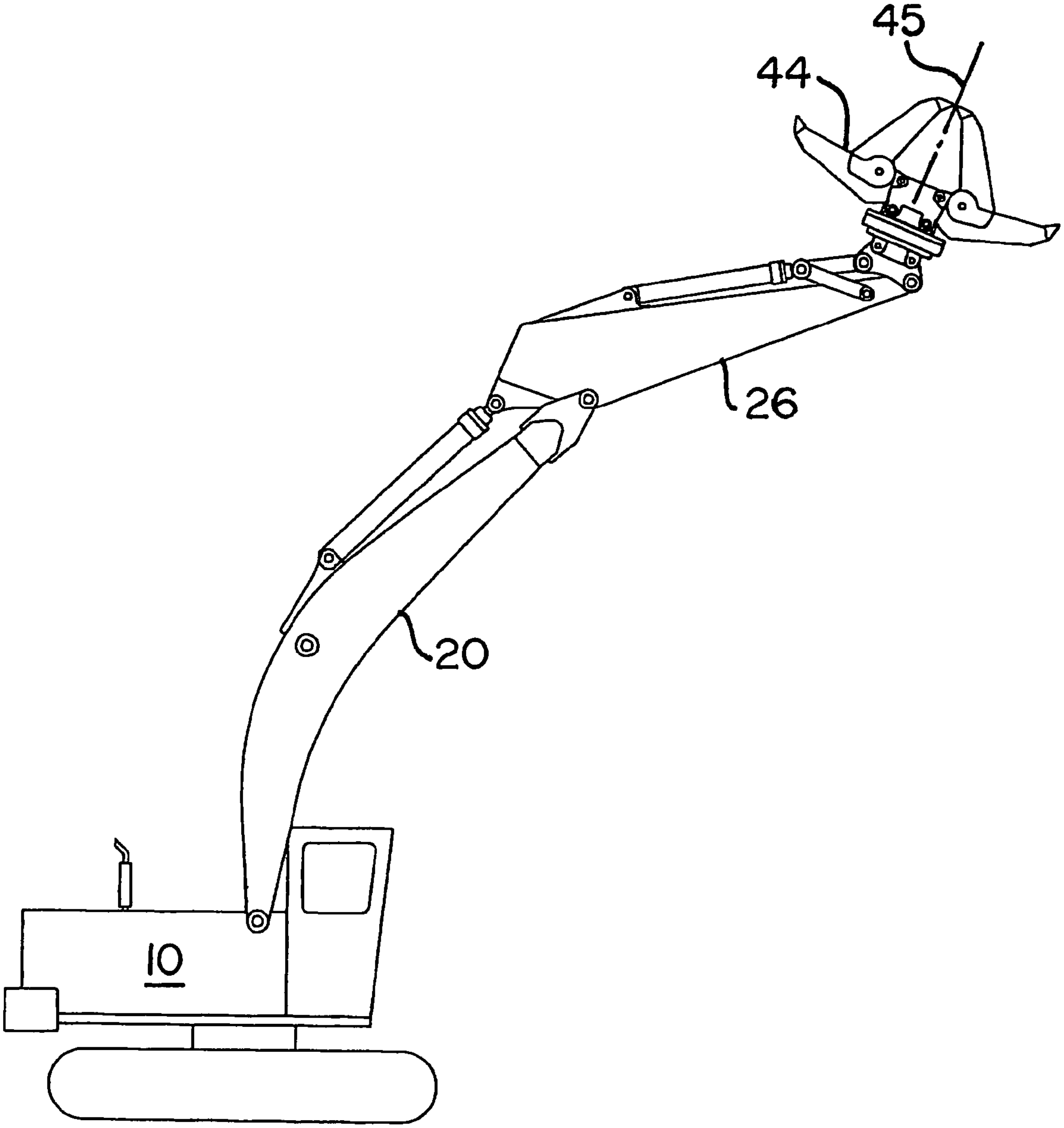
FIG. 3 PRIOR ART
FIG. 3 is prior art and is a sketch of a construction machine used to manipulate a grapple.
Figure 4:
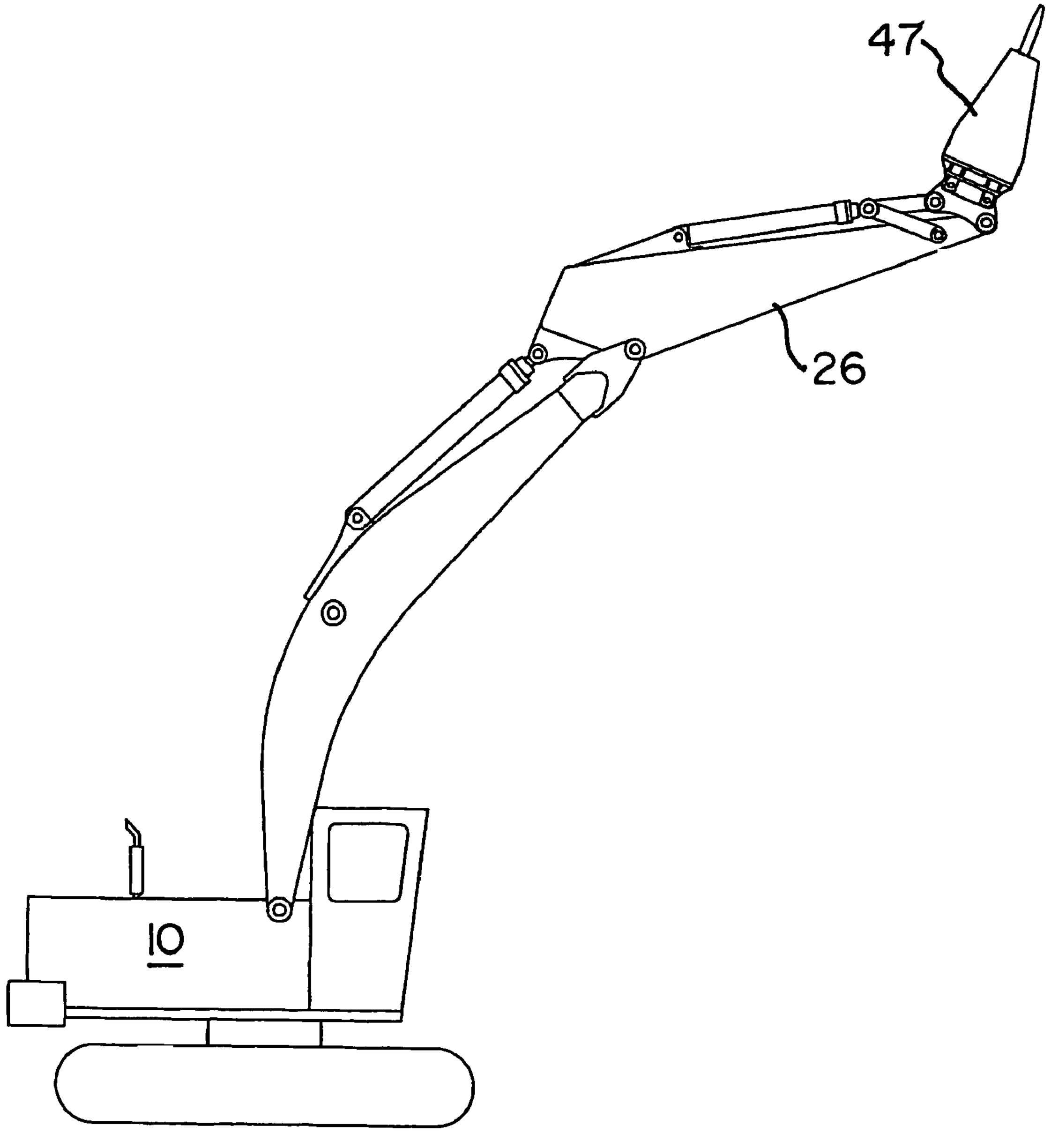
FIG. 4 PRIOR ART
FIG. 4 is prior art and is a sketch of a construction machine used to manipulate a hydraulic hammer.
Figure 5:
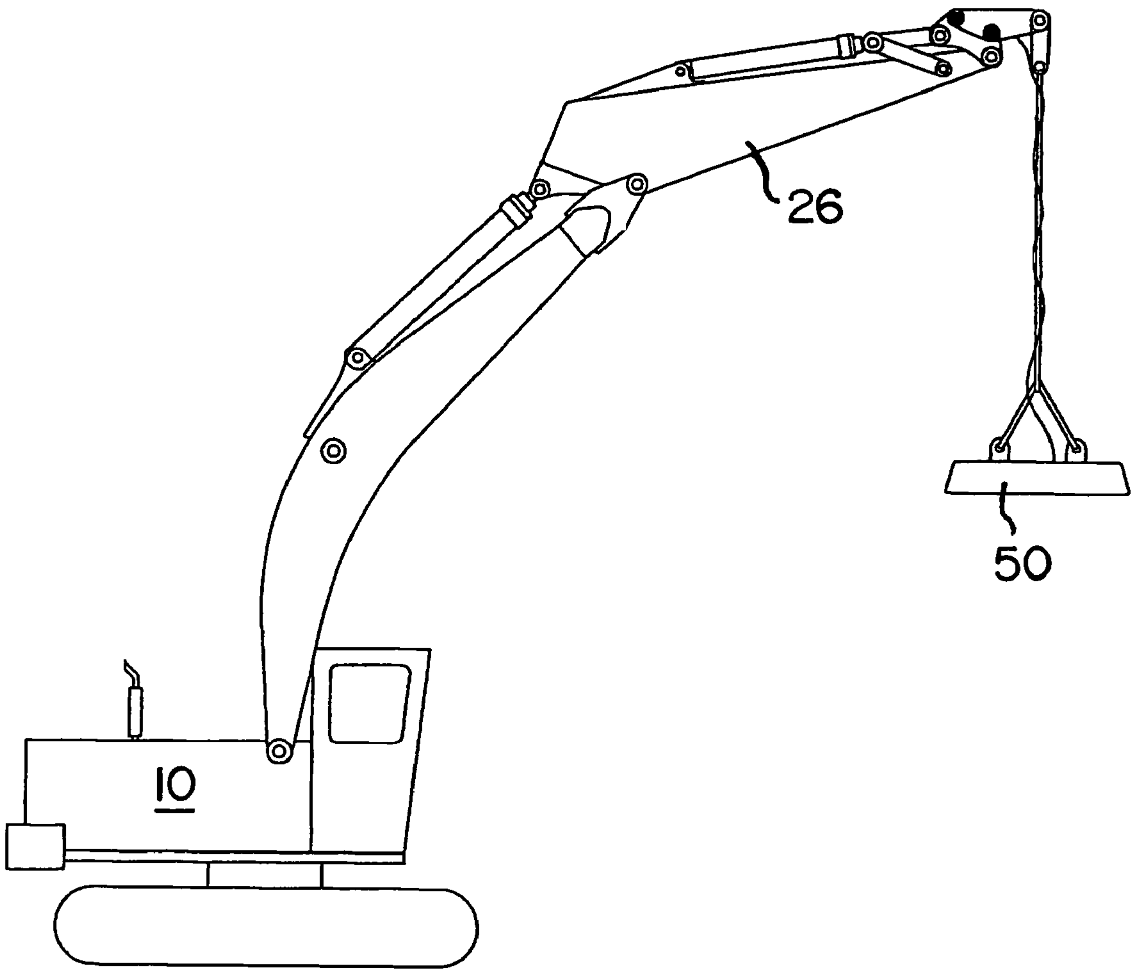
FIG. 5 PRIOR ART
FIG. 5 is prior art and is a sketch of a construction machine utilized to manipulate an electric magnet.
Figure 6:
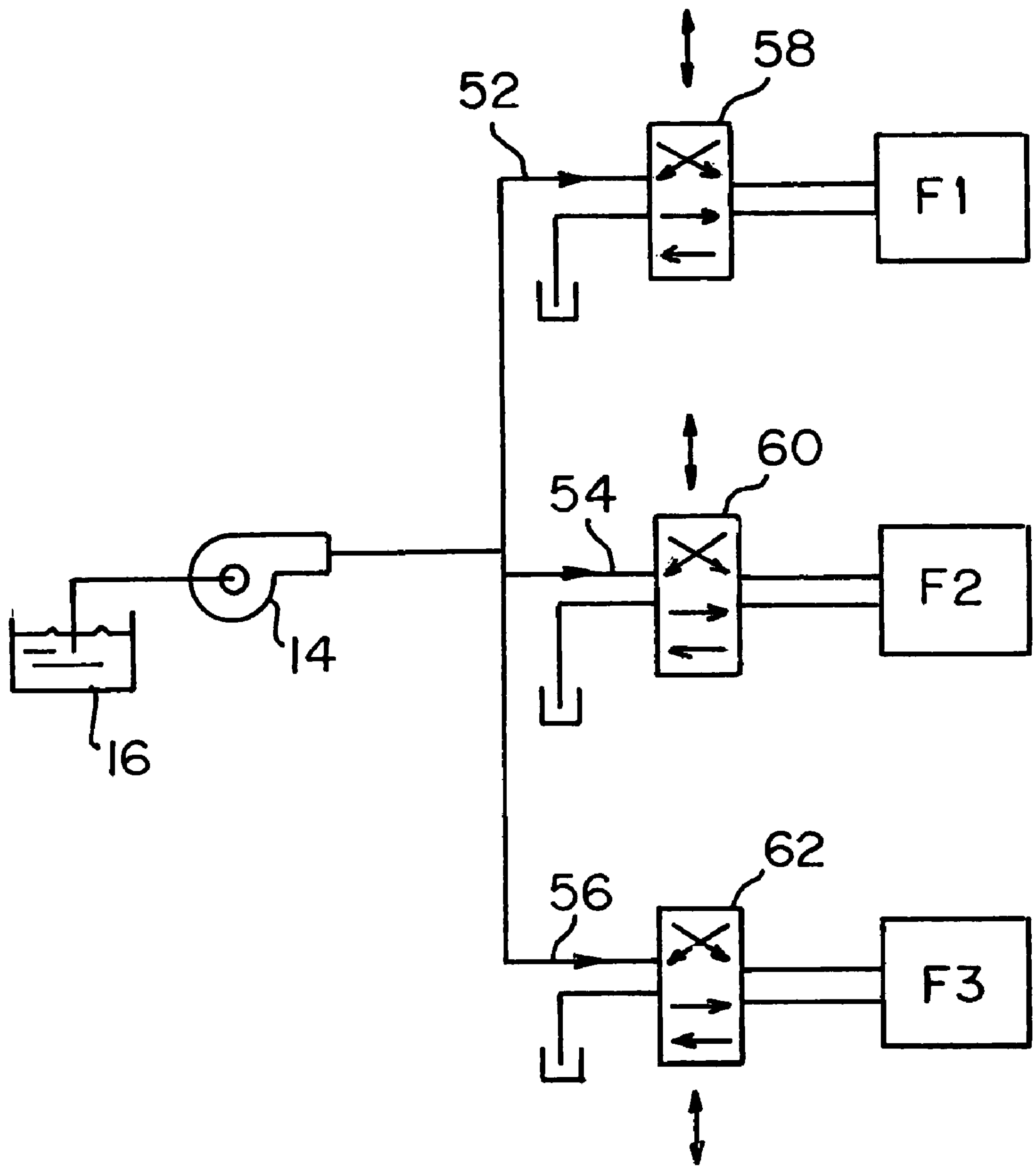
FIG. 6 PRIOR ART
FIG. 6 is prior art and is a schematic of the hydraulic circuit associated with a simple construction machine.

What has just been described is the reassignment of stick motion or pistol grip button motion to perform an entirely different function. In accordance with another aspect of the subject invention, rather than have a single controller motion control two different functions, it is also possible for two different controller motions to operate the same function. Referring to FIG. 12, it should be appreciated that the curl/dump bucket function 115 merely controls the hydraulic cylinder connected to the stick 26 (FIG. 1) to move the bucket 28 between the curl and dump positions. The same cylinder attached to the stick 26 which moves the bucket 28 between the curl and dump positions may also move the shear 35 in the curl/extend position as illustrated in FIG. 2. As a result, this same hydraulic cylinder motion, with different tools attached, may be controlled by control valve 252 or pistol grip buttons 168*a*, 168*b*, depending upon the position of the bucket/tool toggle switch 208.

There are certain functions that do not generally require reassignment of controller motion but do require hydraulic fluid flow sufficient that if such functions are not being utilized, the entire circuit is deactivated. The shear rotate left/right function 127 and the hammer function 135 are two such examples. Directing attention to FIGS. 10, 11 and 13, when the rotate/hammer toggle switch 206 (TS-4L) is toggled toward the "rotate" label, then toggle switch TS-4L (FIG. 11) is closed such that solenoid SOL9 is activated and the flow divider valve 220 divides hydraulic flow such that a portion of the flow is directed through hydraulic line pair 125*a*, 125*b* for use with the shear rotate left/right function 127, utilizing control valve 259. In particular, when buttons 159*a*, 159*b* on the pistol grip 156 of the right side joystick 150 are activated, solenoid SOL11 and solenoid SOL12 are activated, thereby toggling the control valve 259 back and forth between a straight flow and a reverse flow condition. By doing so, the shear rotation direction occurs in one direction or another.

Figure 14:
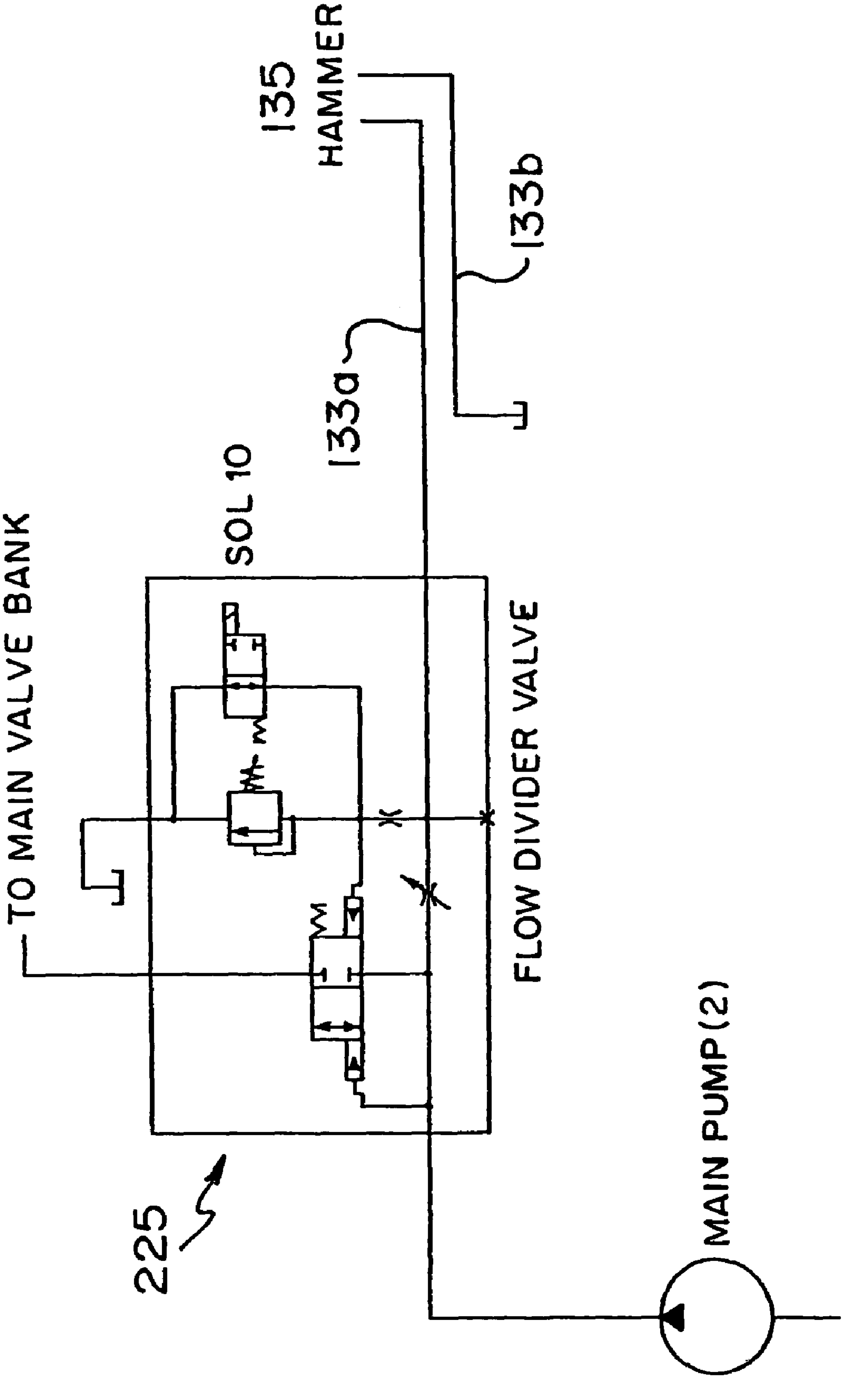
FIG. 14 is a sketch of the hydraulic circuit for activating/deactivating the hammer.

Directing attention to FIGS. 10, 11, and 14, if the hammer function 135 is desired, then the rotate/hammer toggle switch 206 (TS-4R) is toggled to the position closer to the "hammer" label, thereby closing toggle switch TS-4R such that when the trigger 157 on the pistol grip 156 on the right side joystick 150 is depressed, the circuit is completed and solenoid SOL10 is energized, thereby activating flow divider valve 225 and diverting a portion of the flow to hydraulic line pair 133*a*, 133*b* associated with the hammer function 135. It should be noted that unlike the other circuits, the hammer function 135 does not include a control valve since the motion of the bit in the hydraulic hammer is a constant reciprocating motion, which does not need directional control.

Figure 15:
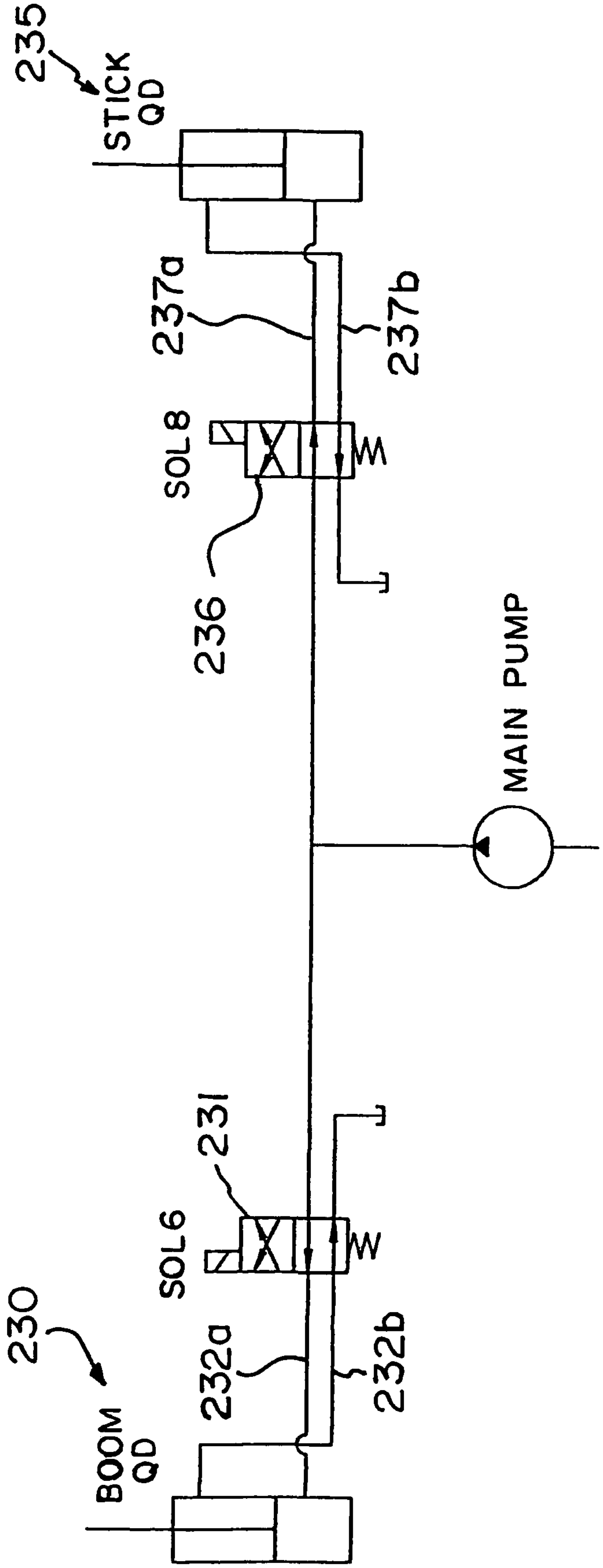
FIG. 15 is a hydraulic circuit for activating/deactivating the quick disconnect couplings associated with the boom and stick attachments.

Directing attention to FIGS. 10, 11, and 15, when the boom quick disconnect toggle switch 202 (TS-2) is activated, safety toggle TS-2 closes the circuit such that solenoid SOL6 is energized, thereby shifting control valve 231 to reverse the flow through hydraulic line pairs 232*a*, 232*b*, thereby activating a cylinder to release the quick connect coupling at the boom 20 (FIG. 1). It should be noted that control valve 231 associated with the boom quick disconnect function 230 is spring biased to a position that urges the quick disconnect coupling to a locked position and, whenever the construction machine is in operation, control valve 231 is active. The boom quick disconnect function 230 and the stick quick disconnect function 235 utilize hydraulically activated couplings to secure the stick 26, and to secure attachments to the stick 26, such as a bucket 28.

Directing attention to the stick quick disconnect function 235 illustrated in FIG. 15, when safety toggle TS-3 is activated, solenoid SOL8 is activated, thereby shifting the position of control valve 236 and reversing the flow of hydraulic fluid within the hydraulic line pair 237*a*, 237*b* and, as a result, moving the cylinder associated with the stick quick disconnect function 235 to the opposite direction, thereby unlocking the coupling. Just as noted before with respect to the boom quick disconnect function 230, control valve 236 associated with the stick quick disconnect function 235 is spring biased to a position, whereby the stick quick disconnect is locked. It should also be pointed out once again, that the control valve 236, whenever the machine is operating, has a supply of pressurized hydraulic fluid.

Figure 16:
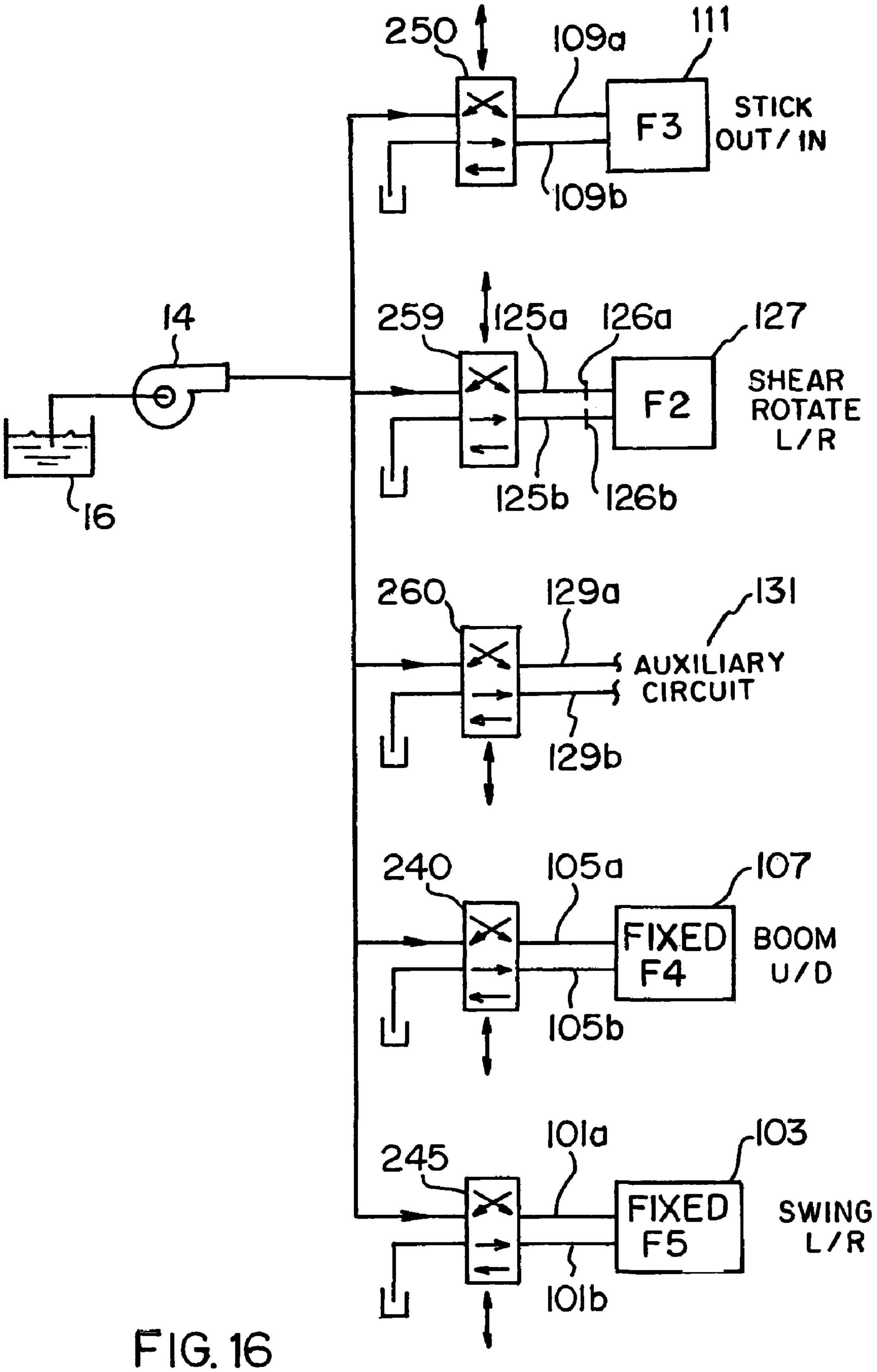
FIG. 16 is a sketch of the hydraulic circuit in which all branches are energized but only some branches are used with accessories or tools.

FIG. 16 illustrates a schematic for activating hydraulic circuits necessary for different functions F2, F3, F4 and F5 on construction machines 10 having a hydraulic tank 16 with fluid therein and a hydraulic pump 14 for providing fluid to hydraulic supply lines. For purposes of explanations, specific functions will be utilized with respect to FIG. 16, however, it should be appreciated that different functions with a construction machine 10 may be substituted and the scope of protection afforded this invention extends beyond the specific assignment of functions discussed with respect to FIG. 16, and also to upcoming FIGS. 17-19.

Directing attention to FIG. 16, each hydraulic line pair as illustrated with respect to the boom up/down function 107 has a supply line 105*a* and a return line 105*b*, wherein the supply line 105*a* receives fluid from the pump 14 while the return line 105*b* returns the hydraulic fluid to the hydraulic tank 16. The return line 105*b* in the Fig. is not extended all of the way to the hydraulic tank 16, but it should be understood that this feature exists. Each pair of hydraulic lines 125*a*, 125*b*, for example, ends at a terminal 126*a*, 126*b* adapted to be connected to a hydraulically operated accessory. For example, function F2 is associated with the shear rotate left/right function 127. Hydraulic line pair 125*a*, 125*b* includes hydraulic line ends 126*a*, 126*b* to define terminal(s) which are adapted to be connected to the hydraulically operated accessories associated with shear rotate left/right function 127. It should be appreciated that the shear rotate left/right function 127 may be replaced with another function that may utilize the same hydraulic line pair 125*a*, 125*b* if the machine operator decides to seek another configuration.

FIG. 16 illustrates at least two fixed function hydraulic pairs 105*a*, 105*b* and 101*a*, 101*b* dedicated to providing fluid for predetermined machine functions F4, F5. A plurality of open-function hydraulic line pairs 109*a*, 109*b*, 125*a*, 125*b*, 129*a*, 129*b* are available providing fluid for other machine functions. As seen, lines 109*a*, 109*b* and 125*a*, 125*b* are connected at their terminals to an accessory, in particular, those associated with functions F2 and F3, for operating that accessory. The remaining open-function hydraulic line pair 129*a*, 129*b* is an auxiliary circuit 131 and is not connected to an accessory. A hydraulic control valve 250, 259, 260, 240, 245 is associated with each hydraulic line pair 109*a*, 109*b*, 125*a*, 125*b*, etc., wherein each hydraulic control valve reverses the flow of hydraulic fluid between the first line and the second line of the associated hydraulic line pair. A controller (not shown) is capable of selectively opening and closing the control valves 250, 259, 260, 240, 245 associated with the hydraulic line pairs, thereby controlling the fluid flow to both the open functions F2, F3 hydraulic line pairs and for the predetermined machine functions F4, F5, along with the unassigned line pair 129*a*, 129*b*.

The construction machine 10 has a base rotationally mounted about the tractor 30 and a boom 20 pivotally attached to the base 22. The fixed function hydraulic line F4, F5 are dedicated to rotating or swinging the base 22 about the tractor 30 and for pivotally moving the boom 20 up and down.

Although line pairs 129*a*, 129*b* are not attached to any particular accessory or tool, it is possible to attach these lines to other tools or accessories as needed or as desired.

In another embodiment, an accessory may be connected directly to the boom 20 or connected directly to the stick 26 attached to the boom 20. The tool may consist of a bucket 28, a shear 35 (FIG. 2), or a hammer 47 (FIG. 4), wherein at least one pair of open-function hydraulic lines is associated with a tool.

In accordance with the subject invention, one pair of hydraulic lines 101*a*, 101*b* is dedicated to swinging the base 22 about the tractor 30 while another pair of hydraulic pairs 105*a*, 105*b* is dedicated to removing the boom 20 up and down. These functions are considered critical in a hydraulic construction machine 10 and, for that reason, there will always be hydraulic lines dedicated to them. On the other hand, a construction machine 10 in accordance with the subject invention has a plurality of other hydraulic line pairs which are not always dedicated to the same function. The interchangeability of the functions in these lines is the basis for referring to these lines as open-function lines.

When the tool is a shear 35, there is at least one pair of hydraulic lines connected to the jaw set of the shear to open and close the jaws, and another set of hydraulic line pairs to rotate the shear 35.

As previously discussed with respect to FIG. 8, the controller is comprised of two joysticks 150, 160, each of which moves laterally to produce controller signals and a series of switches 158, 159 on joystick 150 and switches 168, 169 on joystick 160, that may be depressed to produce additional controller signals, wherein each of these signals operates a control valve.

In the embodiment illustrated in FIG. 16, it should be pointed out that all of the hydraulic line pairs are energized, wherein only some of the hydraulic line pairs are connected to a function. The hydraulic line pair 129*a*, 129*b* for example, has associated with it a control valve but, there is neither a tool nor an accessory attached to hydraulic line pair 129*a*, 129*b*, even though lines 129*a*, 129*b* are energized by the pump 14.

Figure 17:
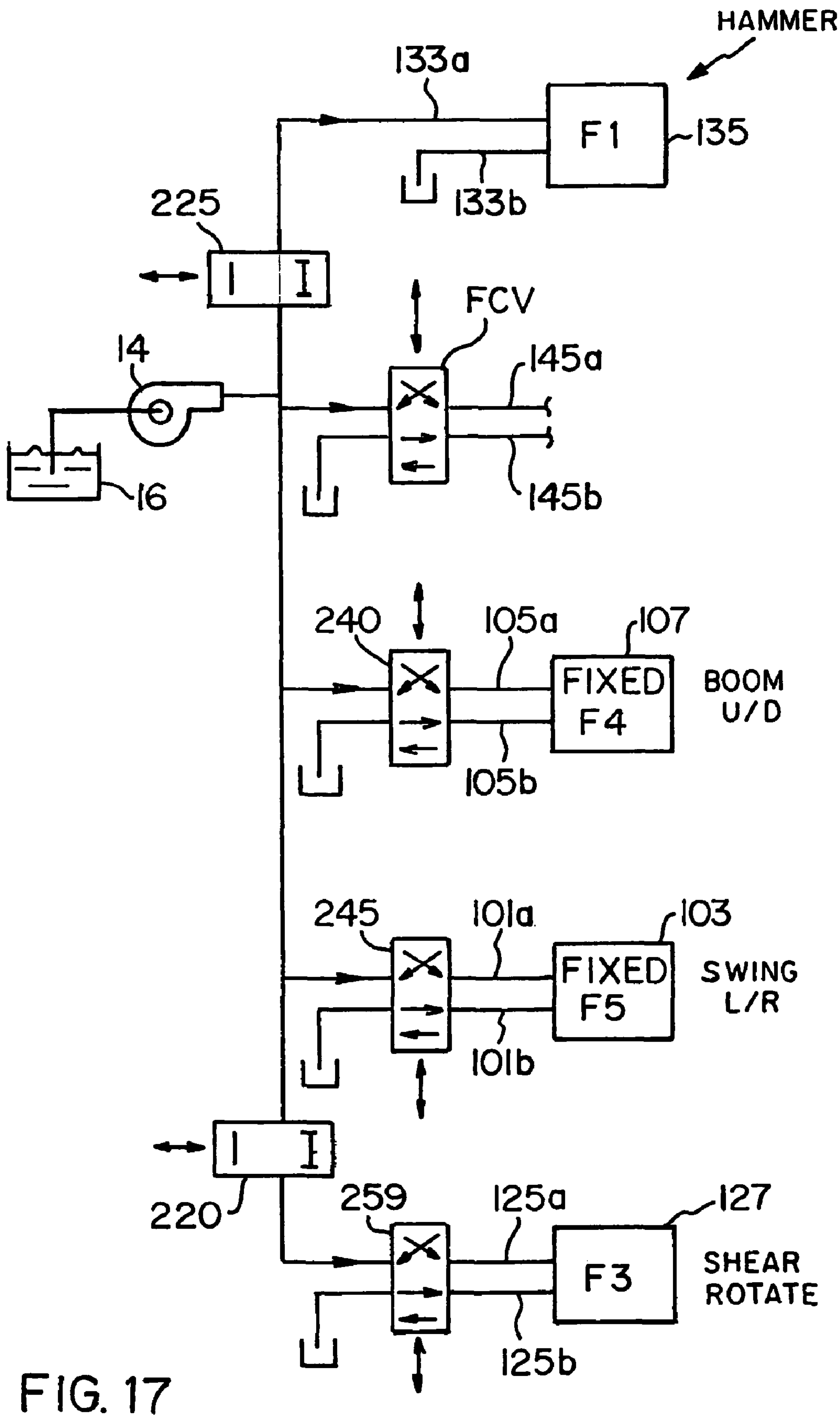
FIG. 17 is a sketch of a hydraulic circuit whereby select branches are activated/deactivated.

FIG. 17 illustrates another embodiment similar to that embodiment illustrated in FIG. 16, whereby however, while certain hydraulic line pairs are present the hydraulic fluid supply to them is severed by a flow divider valve.

Figure 13:
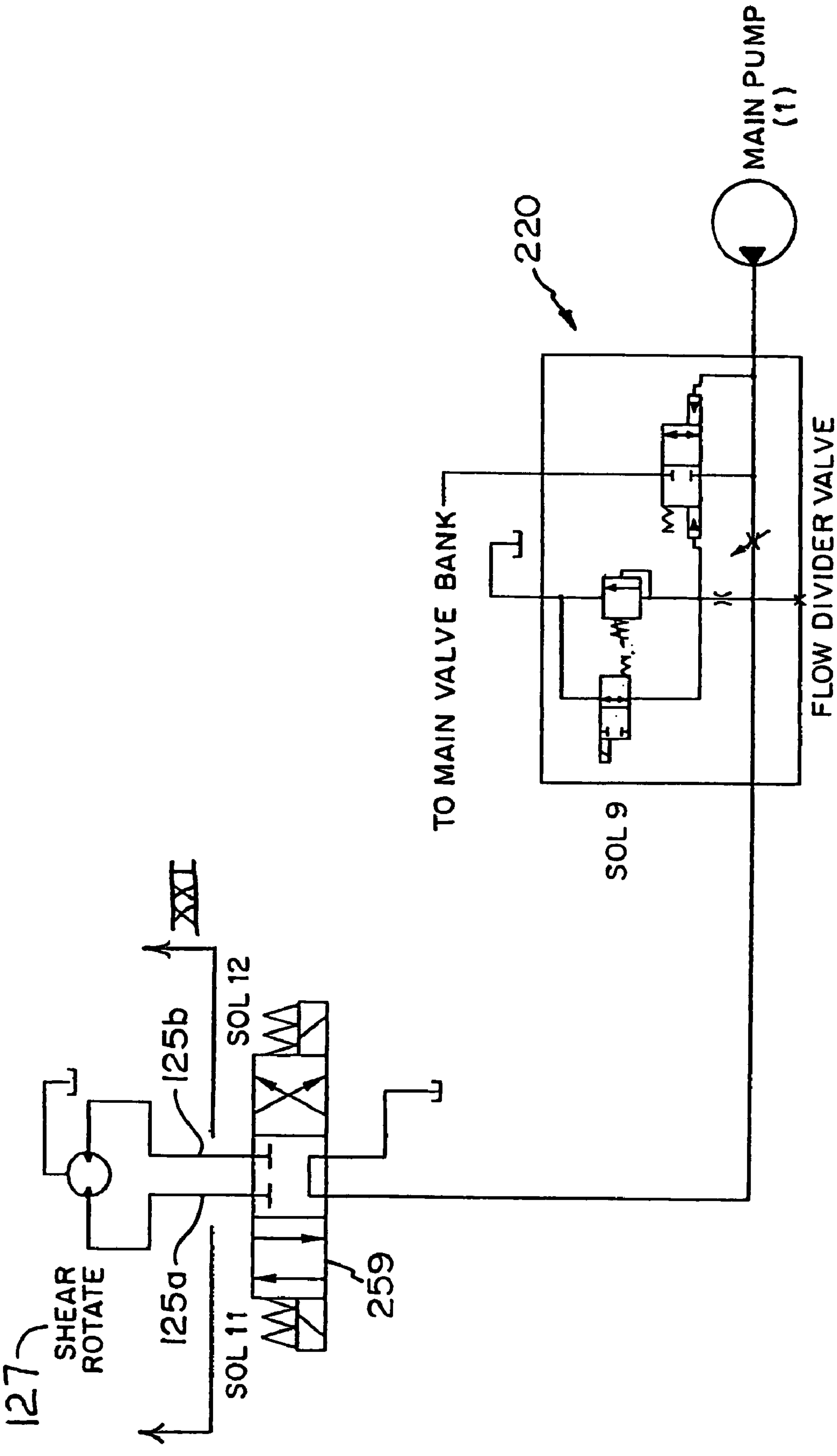
FIG. 13 is a sketch of the hydraulic circuit for activating/deactivating the shear rotate functions.

Directing attention to FIG. 17, this schematic focuses on the arrangement generally illustrated in FIGS. 13 and 14. At least two fixed hydraulic line pairs 105*a*, 105*b* and 101*a*, 101*b* are dedicated to providing fluid for predetermined machine functions, in particular, the swing right/left function 103 of the platform and the boom up/down function 107. These hydraulic lines 105*a*, 105*b*, 101*a*, 101*b* are activated during normal system operation. A plurality of open-function hydraulic line pairs 133*a*, 133*b*, 125*a*, 125*b* and 145*a*, 145*b* are available for providing fluid for other machine functions. These open-function hydraulic line pairs 133*a*, 133*b*, 125*a*, 125*b* and 145*a*, 145*b* have hydraulic pair ends at terminals adapted to be connected to other hydraulic accessories, such as the hammer function 135 or the shear rotate function 127.

Directing attention to the hammer function 135, a flow divider valve 225 is associated with hydraulic line 133*a*, 133*b* and is downstream of the pump 14. The flow divider valve 225 is operable to divide the flow and to supply fluid to the hydraulic line pair 133*a*, 133*b* associated with the hammer function 135, while at the same time, permit fluid that has not been diverted to other functions on the construction machine 10. It should be noted that at least with respect to the hammer function 135, there is no hydraulic control valve because the hammer function 135 merely reciprocates the hammer without respect to any particular direction. However, each of the remaining pairs of hydraulic lines may have associated therewith a hydraulic control valve. A master controller (not shown) manipulates the flow diverter valve 225 to selectively activate the associated open function line pair 133*a*, 133*b* to activate the hammer function 135.

Additionally, a controller (not shown) is capable of selectively controlling all of the hydraulic flow control valves 240, 245, 259 associated with the hydraulic lines and unassigned lines 145*a*, 145*b*. As illustrated in FIG. 17, the accessory associated with the flow divider valve 225 may be a hammer function 135, while the accessory associated with the flow diverter valve 220 may be the shear rotate function 127. It should be noted that the hammer function 135 does not require a control valve between the hammer function 135 and the pump 14, wherein the control valve 259 reverses the flow of the hydraulic fluid between the first line 125*a* and the second line 125*b* of the hydraulic pair.

Figure 18:
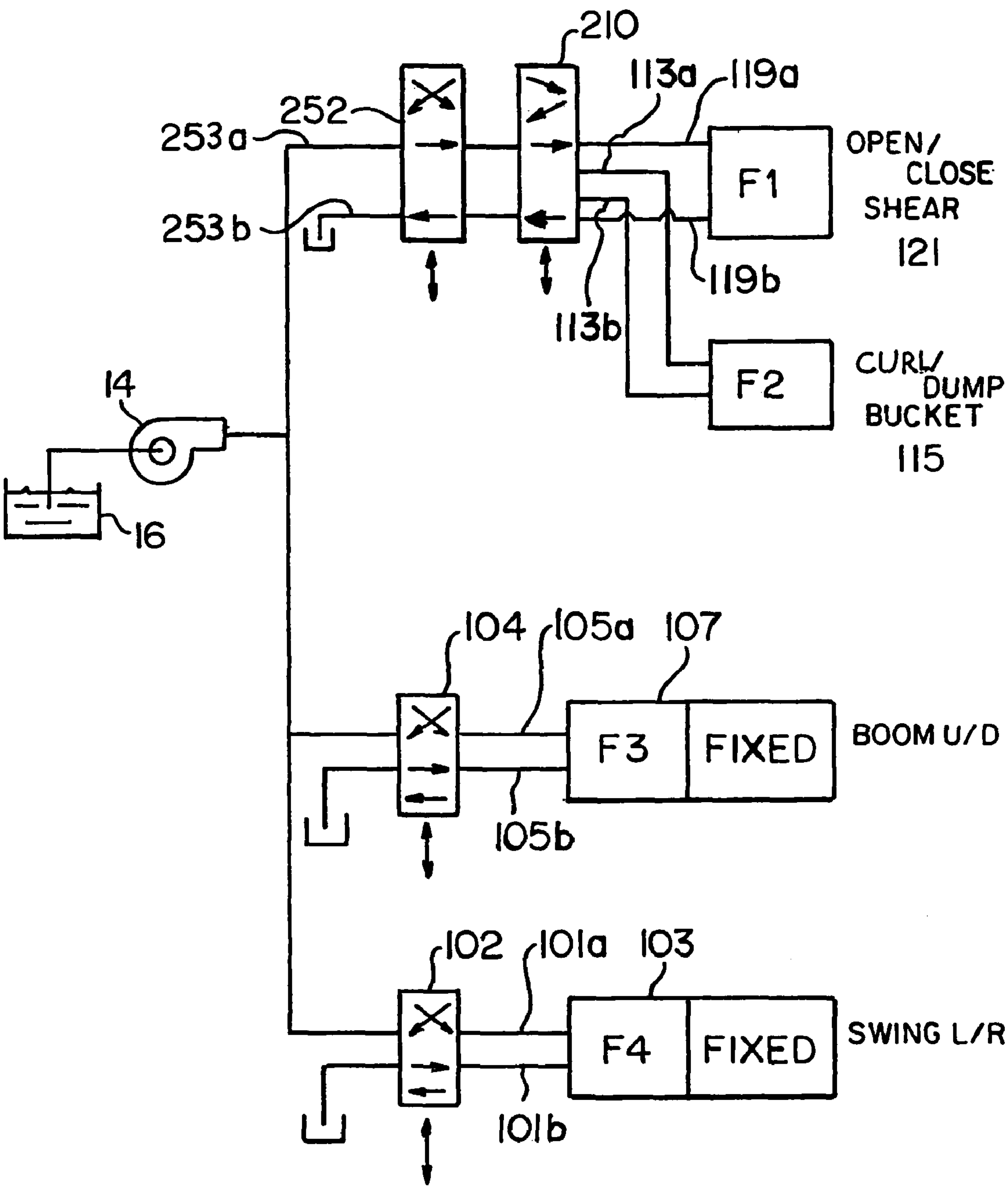
FIG. 18 is a sketch of a hydraulic circuit whereby one flow control valve controls two separate functions.

In another embodiment of the subject invention, a single controller action may be used to perform different functions. One such example will be illustrated with respect to FIG. 12 and FIG. 18. A hydraulic control valve 252 controls the flow for hydraulic feeder line pairs 253*a*, 253*b*. Additionally, a flow diverter valve 210 diverts flow from the pair of feeder lines 253*a*, 253*b*, wherein in the first position the flow diverter valve 210 diverts flow from the feeder lines 253*a*, 253*b* to a first pair of branch hydraulic lines 119*a*, 119*b* and in a second position, the flow diverter valve 210 directs flow to a second pair of hydraulic branch lines 113*a*, 113*b* with each pair of branch lines 113*a*, 113*b*, 119*a*, 119*b* adapted to receive an accessory attached thereto. It should be noted here that control valve 252 associated with the pair of feeder hydraulic lines 253*a*, 253*b* is positioned between the flow diverter valve 210 and the pump 14. Control valve 252 reverses the flow of hydraulic fluid between the first line 253*a* and the second line 253*b* of a hydraulic pair. As illustrated in FIG. 18, there are two fixed function lines, one associated with the boom up/down function 107 and another associated with the swing left/right function 103.

Once again, a master controller (not shown) is used to manipulate the flow diverter valve 210 to tend to selectively activate the associated hydraulic pair 119 or 113. The joystick/pistol grip controllers are capable of selectively controlling the hydraulic control valves 252, 104, 102 associated with the hydraulic lines.

In the embodiment illustrated in FIG. 18, the single control valve 252 is capable of controlling two functions depending upon the position of the flow diverter valve 210. In a first position of the flow diverter valve, function F1, which may be the open/close shear function 121, is activated while in a second position of the flow diverter valve 210, function F2, which may be a curl/dump bucket function 115 is activated.

Figure 19:
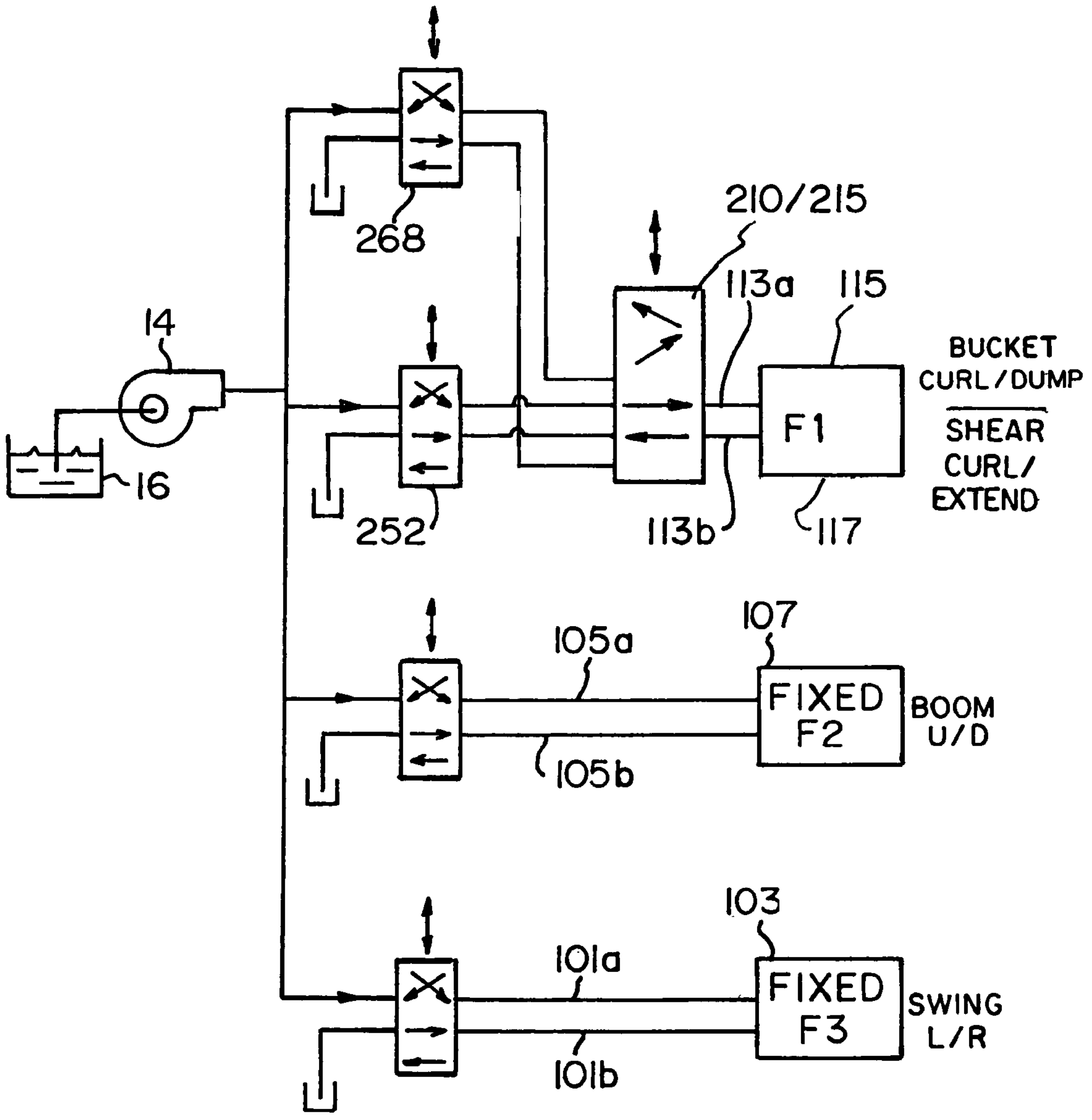
FIG. 19 is a sketch of a hydraulic circuit whereby two flow control valves control the same function.

In yet another embodiment, it is possible for two control valves to control a single function. Directing attention to FIGS. 9 and 19, the bucket curl/dump function 115 is activated by lateral motion of the right hand joystick 150 which operates the same hydraulic cylinder that would be operated by the buttons 168*a*, 168*b* on the left side joystick 160 referred to as shear cylinder curl/extend. Directing attention to FIGS. 12 and 19, both the curl/dump bucket function 115 and the curl/extend shear function 117 are controlled by hydraulic fluid provided through line pairs 113*a*, 113*b*. Depending upon the position of flow diverter valves 210, 215 (see FIG. 12 also) either control valve 268 or control valve 252 will operate function F1, so that either the curl/dump bucket function 115 or the curl/extend shear function 117 is implemented. It should be noted that while FIG. 12 illustrates two separate flow diverter valves 210, 215, the concept of controlling a single function with two separate control valves still applies as illustrated in FIG. 19.

In general, what has been described is a construction machine 10 having at least two fixed functions which have been defined as the swing left/right of the base 22 on the tractor 30 and the pivotal movement of the boom 20 up and down. A controller for the control valves discussed herein is the joystick 150 with the pistol grip 156 attached thereto with a plurality of buttons, wherein the lateral motion of one of the joysticks or the depression of one of the buttons on the pistol grips may act to energize the control valve.

In the instance where a shear is utilized with the construction machine, the shear typically is capable of rotating, opening and closing, and pivoting about an axis. Under these circumstances it should be appreciated that three open-function hydraulic lines will be dedicated to providing fluid to the shear to achieve these tasks.

In the instance where the tool is a bucket 28, then the bucket 28 must be capable of pivoting or extending and this single task is achieved through one open-function hydraulic line dedicated to providing fluid to the bucket to achieve this task.

In yet another embodiment, the hydraulic hammer 47 must be capable of pivoting about the structural element to which it is attached, and furthermore, to provide repetitious impact. For that reason, when the hammer is utilized, two open-function hydraulic line pairs are dedicated to provide fluid to the hammer 47 to achieve these tasks.

The configurations of tools and accessories illustrated on the construction machine 10 in FIGS. 1-5 are only intended to illustrate a few of the many construction machine 10 configurations possible in accordance with the subject invention and should not be construed as limiting the scope of the subject invention. As another example, the stick 26 may be removed and each tool illustrated in FIGS. 1-5, as attached to the stick 26, could be attached directly to the boom 20.

What has been described is a system utilizing a series of manual switches to manipulate valves for controlling tools and accessories of a construction machine. These manual switches could be replaced through PLC logic and such a modification would be obvious to one skilled in the art of hydraulic systems.

Figure 20:
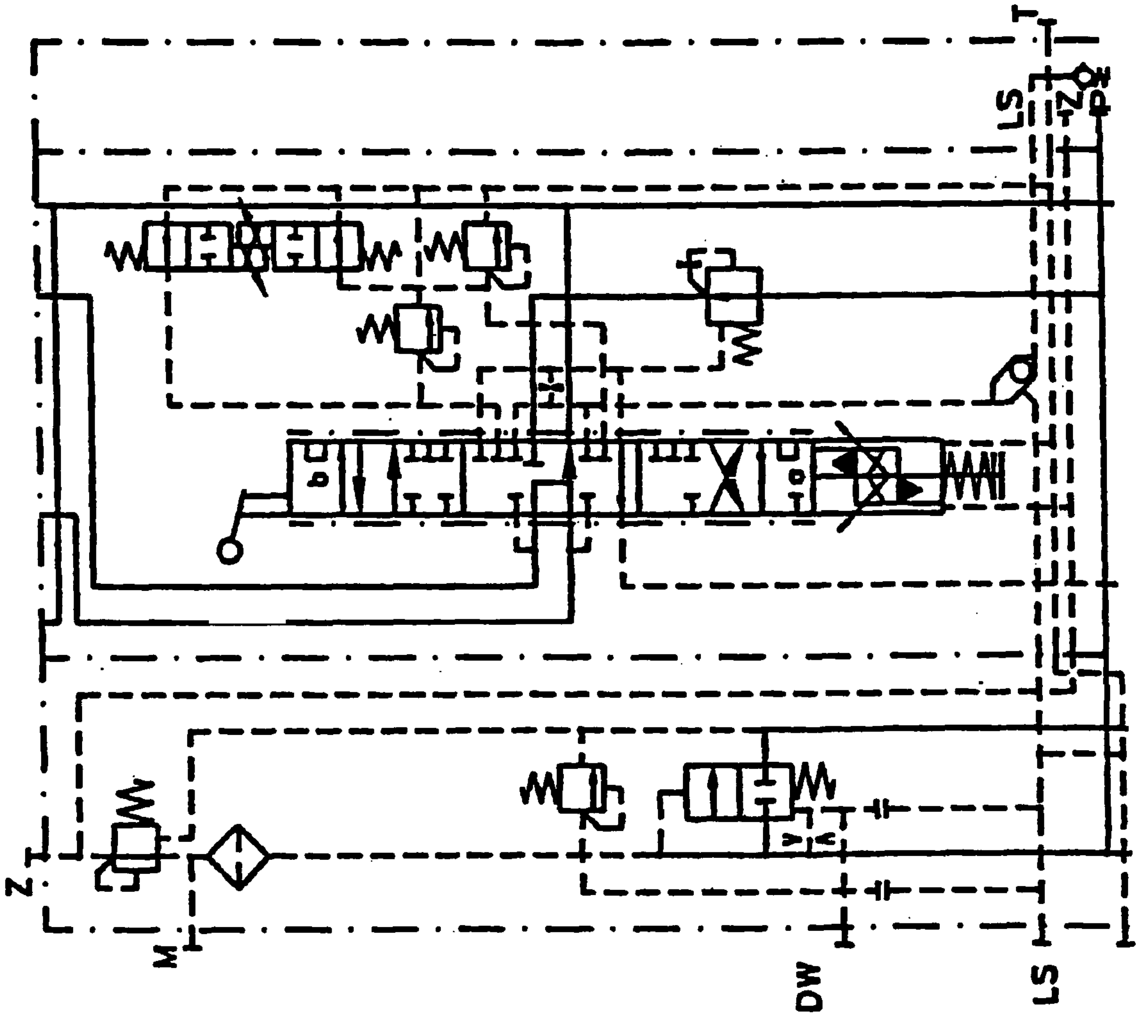
FIG. 20 is a schematic of a proportional control valve that may be substituted for the control valve 268 illustrated in FIG. 12.

FIG. 12 illustrates a control valve 268 to provide reversing flow of fluid through hydraulic line pairs 113*a*, 113*b* or 119*a*, 119*b*, depending upon the position of diverter valve 215. It is possible to substitute this control valve 268 with the proportional control valve 800 illustrated in FIG. 20. This valve 800 provides multiple control functions in a remote hydraulic spool shifting circuit. This electrically controlled valve has features that integrate a pressure reducing/relieving function, a 4-way directional control function and it will accept a soft shift ramp signal from an amplifier control board and provide an independently adjustable pilot pressure to the A and B work ports. The valve 800 may be rated to 6000 PSI at 10 GPM.

The valve 800 is electrically operated, with one electrical connection for the "directional control" function and another electrical connection for the "reduced pressure function". The valve 800 has manual overrides on both functions so troubleshooting in the field is easy to accomplish, i.e., the valve 800 can be manually operated if there is a question of its electrical functionality.

The valve 800 is suited for the pressure and flow of the hydraulic pilot circuits commonly found on construction equipment. The valve 800 can also be incorporated into higher pressure circuits if required.

An electrical control box may also be utilized to operate the valve 800. The box would contain a lockable NEMA 4 enclosure and contain the two amplifier boards for proportionately controlling the signals to the directional and pressure limiting functions of the control valve 800. The adjustments may be mounted internal to the control box. The full pressure from the excavator would be selected when in bucket mode and reduced pilot pressure would be sent through the valve when in tool mode. The pilot pressure amplifier board would permit independent pre-set of the outlet pressure signals to the A and B ports from as low as 200 PSI up to the maximum of the machines pilot pressure of 600 PSI. A separate amplifier board also allows for dampening the "shift time" of the 4-way function of the control valve 800. This "shift time" adjustment is up to approximately 4 to 5 seconds from the center to full shift in both directions.

The electrical enclosure may have a seal tight connection and/or grommets for the incoming and outgoing wiring. The electrical connections may be the input voltage and ground wires, incoming signals from the buttons on the joy sticks, the outgoing wires to the 4-way function and to the pressure control function plus the incoming selection signal from the tool or bucket switch.

Figure 21:
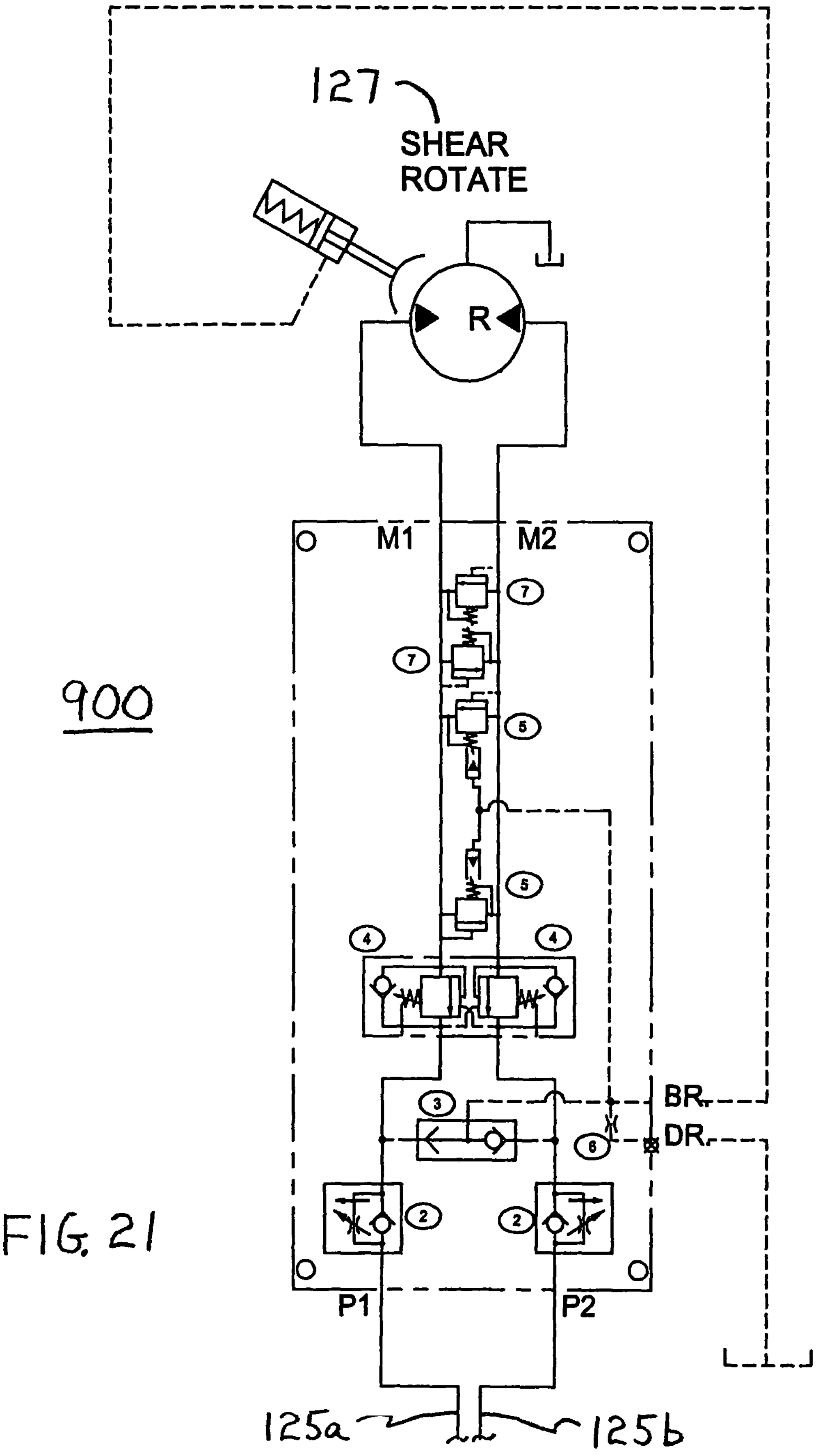
FIG. 21 is a schematic of a substitute control circuit as part of the shear rotation circuit.

Directing attention to FIG. 13, arrows XXI-XXI indicate a section of the shear rotation circuit that may be replaced with the substitute control circuit 900 illustrated in FIG. 21. The point of attachment of the circuit 900 is at line pair 125*a*, 125*b*. The substitute control circuit 900 provides speed, pressure and rotation control while minimizing the shock loads into the rotation drive components. Two identical valves with different pressure settings are used, based on the size of the shear.

The substitute control circuit 900 works as follows. A hydraulic circuit manifold provides adjustable pressure-compensated, restrictive-style flow controls (FLOW-CONTROLS) on the input to the shear rotate motor/motors. The manifold further provides a shuttle valve to sense pressure in order to pilot open the spring applied brake on the shear rotate drive and to pilot close the low pressure braking relief valves (SHUTTLE VALVE). The manifold further provides counterbalance valves which allow free flow to the shear rotate hydraulic motor/motors and prevents the motors from running away from the oil-supply during over-hung, over-running loads on the rotate drive-shear assembly. The manifold further provides two sets of relief valves, one set to limit the maximum pressure to the drive motor/motors while rotating the shear and the second set to provide lower pressure control for the deceleration of the shear. These lower pressure relief cartridges which are only active during stopping the shear and/or holding the shear provide for a softer braking of the rotating mass. The manifold further provides a fixed dampening orifice to allow the low pressure relief valves' pilot and spring chambers, plus the brake release pilot pressure to drain to the tank when the shear is not rotating.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A system for activating hydraulic circuits necessary for different functions on a construction machine having a hydraulic tank with fluid therein, a hydraulic pump for providing fluid to hydraulic supply lines, wherein each hydraulic supply line has a related hydraulic return line for returning the fluid to the hydraulic tank thereby defining hydraulic line pairs and, wherein each pair of hydraulic lines ends at a terminal adapted to be connected to a hydraulically operated accessory, comprising:

a) at least two fixed-function hydraulic line pairs dedicated to providing fluid for predetermined machine functions;

b) a plurality of open-function hydraulic line pairs available for providing fluid for other machine functions, wherein one or more of these line pairs are each connected at their terminal to an accessory for operating that accessory and the remaining open-function hydraulic lines are not connected to an accessory;

c) a hydraulic flow control valve associated with each hydraulic line pair, wherein each flow control valve reverses the flow of hydraulic fluid between the first line and the second line of a hydraulic pair;

d) a controller capable of selectively opening and closing each of the flow control valves associated with hydraulic line pairs, thereby controlling fluid flow to the open function hydraulic line pairs and to the fixed function hydraulic line pairs; and e) a master control panel which enables two separate controller commands to activate a single flow control valve and/or enables a single controller command to activate one of at least two hydraulic flow control valves.

2. The system according to claim 1, wherein the construction machine has a platform rotationally mounted about a base, a boom pivotally attached to the platform, and, wherein the fixed-function hydraulic lines are dedicated to rotating the platform about the base and pivotally moving the boom up and down.

3. The system according to claim 2, wherein at least one accessory is a stick pivotally attached to the boom and one open-function hydraulic line is dedicated to pivotally moving the stick up and down.

4. The system according to claim 2, wherein the accessory is a tool connected directly to the boom or connected to the end of a stick pivotally attached to the boom, wherein the tool consists of one from the group of a bucket, a shear, a magnet, and a hammer and, wherein at least one pair of open-function hydraulic lines are associated with the tool.

5. The system according to claim 2, wherein the accessory is a tool connected directly to the end of a stick pivotally attached to the boom, wherein the tool is a jaw set with opposing pivoting jaws, and wherein open-function hydraulic line pairs are connected to the jaw set to open and close the jaws and to rotate the jaws.

6. The system according to claim 1, wherein the controller is comprised of two joysticks, each of which moves laterally to produce controller signals, and a series of switches on the joystick that may be depressed to produce additional controller signals, wherein the signals operate the control valves.

7. The system according to claim 1, further including a quick connect coupling between each terminal and an accessory.

8. The system according to claim 1, wherein a) the at least two fixed-function hydraulic line pairs dedicated to providing fluid for predetermined machine functions are always activated during system operation;

b) a flow divider valve associated with one pair of open-function lines, wherein the flow divider valve is connected to an activated hydraulic line pair and is operable to divide the flow and supply fluid to both the fixed-function hydraulic line pair and a hydraulic line pair associated with an accessory; and c) wherein the master control panel manipulates the flow divider valve to selectively activate the associated open-function hydraulic line pair.

9. The system according to claim 8, wherein the accessories associated with the flow divider valve are the shear open/close and the bucket curl/dump.

10. The system according to claim 8, further including a control valve between the accessory and the pump, wherein the control valve reverses the flow of hydraulic fluid between the first line and the second line of a hydraulic pair.

11. The system according to claim 8, further including a quick connect coupling between each terminal and an accessory.

12. The system according to claim 1:

a) wherein the at least two fixed-function hydraulic lines dedicated to providing fluid for predetermined machine functions are always activated during system operation;

b) further including a flow diverter valve for diverting the flow from a pair of feeder hydraulic lines, wherein in a first position, the diverter valve directs flow to a first pair of branch hydraulic lines and, in a second position, the diverter valve directs flow to a second pair of branch hydraulic lines, with each pair of branch hydraulic lines is adapted to receive an accessory attached thereto, wherein the control valve associated with the pair of feeder hydraulic lines is positioned between the flow diverter valve and the pump, and wherein the control valve reverses the flow of hydraulic fluid between the first line and the second line of a hydraulic pair; and c) wherein when the master control panel enables a single controller commands to activate one of at least two hydraulic flow control valves then the master control panel positions the flow diverter valve to direct fluid to one of the two branch hydraulic lines.

13. The system according to claim 12, wherein one accessory is a bucket and the first pair of hydraulic lines provides fluid to curl and dump the bucket and the other accessory is a rotator which provides rotation to a tool secured to the second pair of hydraulic lines.

14. The system according to claim 1:

a) wherein the at least two fixed-function hydraulic lines dedicated to providing fluid for predetermined machine functions are always activated during system operation;

b) further including a flow diverter valve for directing the flow from one of two pairs of feeder hydraulic lines to one pair of branch hydraulic lines, wherein in a first position, the flow diverter valve directs flow from a first pair of feeder hydraulic lines to the pair of branch lines and, in a second position, the flow diverter valve directs flow from a second pair of feeder hydraulic lines to the pair of branch lines, wherein each pair of branch lines has an accessory attached thereto;

c) wherein when the master control panel enables two separate controller commands to activate a single hydraulic flow control valve, then the master control panel, in a first position, positions the flow diverter valve to direct fluid from the first pair of the two pairs of feeder hydraulic lines to the branch hydraulic lines and, in a second position, positions the flow diverter valve to direct fluid from the second pair of the two pairs of feeder hydraulic lines to the branch hydraulic lines; and d) wherein the controller which, with the master control panel in the first position, for a particular motion or force imparted to the controller, controls fluid in the branch hydraulic lines and, with the master control panel in the second position, for a different motion or force imparted to the controller, controls fluid in the same branch hydraulic line.

15. The system according to claim 14, wherein the construction machine has a platform rotationally mounted about a base, a boom pivotally attached to the platform and wherein the fixed-function hydraulic lines are dedicated to rotating the platform about the base and pivotally moving the boom up and down.

16. The system according to claim 15, wherein the construction machine further includes a stick pivotally attached to the boom and one open-function hydraulic line is dedicated to pivotally moving the stick up and down.

17. The system according to claim 15, further including a tool connected directly to the boom or connected to the end of a stick pivotally attached to the boom, wherein the tool consists of one from the group of a bucket, a shear, and a hammer.

18. The system according to claim 17, wherein the tool is a shear capable of rotating, opening/closing, and pivoting about an axis and, wherein in a shear configuration, open-function hydraulic lines are dedicated to provide fluid to the shear to achieve these tasks.

19. The system according to claim 17, wherein the tool is a bucket capable of pivoting to dump or extend the bucket and, wherein in a bucket configuration, one open-function hydraulic line is dedicated to provide fluid to the bucket to achieve this task.

20. The system according to claim 17, wherein the tool is a hammer capable of pivoting and repetitious impact and, wherein in a hammer configuration, two open-function hydraulic lines are dedicated to provide fluid to the hammer to achieve these tasks.

21. The system according to claim 14, wherein the controller is a pair of joysticks and lateral motion of each joystick produces a command which opens and closes hydraulic valves, and wherein the controller further includes a plurality of on/off switches which themselves produce commands which open and close hydraulic valves.

22. The system according to claim 21, wherein the master control panel selectively activates different combinations of open-function hydraulic lines depending upon the tool mounted to the boom or to the stick attached to the boom such that some commands produced by the controller are directed to active hydraulic lines while others are directed to inactive hydraulic lines.

23. The system according to claim 22, wherein for a given tool mounted to the boom or to the stick attached to the boom, the master control panel activates specific open-function hydraulic lines to produce a predefined protocol of controller movements for that tool.

24. The system according to claim 23, wherein a command operates a single dedicated hydraulic line.

25. The system according to claim 23, wherein by reassignment by the master control panel, a command may operate either one of two hydraulic lines.

26. The system according to claim 1:

a) wherein the construction machine has a platform rotationally mounted about a base, a boom pivotally attached to the platform, and at least one additional member attached to the boom for performing work;

b) wherein a distinct command from the controller is associated with a particular task and operates a hydraulic valve to direct pressurized hydraulic fluid through a hydraulic line to a first hydraulic terminal which controls a movement of the platform, boom or member attached thereto; and c) further including a flow diverter valve in the hydraulic line downstream of the hydraulic valve to redirect the hydraulic fluid to a second hydraulic terminal, thereby reassigning the distinct command of the controller to a different task.

27. A method for activating hydraulic circuits necessary for different functions on a construction machine having a hydraulic tank with fluid therein, and a hydraulic pump for providing fluid to hydraulic supply lines, wherein each hydraulic supply line has a related hydraulic return line for returning the fluid to the hydraulic tank, thereby defining hydraulic line pairs and, wherein each pair of hydraulic lines ends at a terminal adapted to be connected to a hydraulically operated accessory, comprising the steps of:

a) providing fluid for predetermined machine functions using at least two fixed-function hydraulic line pairs;

b) providing fluid for other machine functions using a plurality of open-function hydraulic line pairs, wherein one or more of these line pairs are connected at their terminal to an accessory for operating that accessory and the remaining open-function hydraulic lines are not connected to an accessory;

c) providing a hydraulic flow control valve associated with each hydraulic line pair, wherein each flow control valve reverses the flow of hydraulic fluid between the first line and the second line of a hydraulic pair;

d) providing a controller capable of selectively opening and closing each of the flow control valves associated with hydraulic line pairs thereby controlling fluid flow to the open function hydraulic line pairs and for the fixed-function hydraulic line pairs; and e) providing a master control panel which enables two separate controller commands to activate a single flow control valve and/or enables a single controller command to activate one of at least two hydraulic flow control valves.

28. The method according to claim 27;

a) wherein during the step of providing fluid for predetermined machine functions using at least two fixed-function hydraulic line pairs, these hydraulic lines are always activated during system operation;

b) providing a flow divider valve associated with one pair of open-function lines, wherein the flow divider valve is connected to an activated hydraulic line pair and is operable to divide the flow and supply fluid to both the fixed-function hydraulic line pairs and a hydraulic line pair associated with an accessory; and c) manipulating the flow divider valve to selectively activate the associated open-function hydraulic line pair.

29. The method according to claim 27:

a) wherein during the step of providing fluid for predetermined machine functions to at least two fixed-function hydraulic lines, these hydraulic lines are always activated during system operation;

b) diverting the flow from a pair of feeder hydraulic lines with a flow diverter valve, wherein in a first position, the valve directs flow to a first pair of branch hydraulic lines and, in a second position, the valve directs flow to a second pair of branch hydraulic lines wherein each pair of branch hydraulic lines is adapted to receive an accessory attached thereto, wherein the control valve associated with the pair of feeder hydraulic lines is positioned between the flow diverter valve and the pump and wherein the control valve reverses the flow of hydraulic fluid between the first line and the second line of a hydraulic pair; and c) positioning the flow diverter valve to direct fluid to one of the two branch hydraulic lines.

30. The method according to claim 27, wherein a) during the step of providing fluid for predetermined machine functions using at least two fixed-function hydraulic lines these hydraulic lines are always activated during system operation;

b) providing a flow diverter valve for directing the flow from one of two pairs of feeder hydraulic lines to one pair of branch hydraulic lines, wherein in a first position, the flow diverter valve directs flow from a first pair of feeder hydraulic lines to the pair of branch lines and, in a second position, the flow diverter valve directs flow from a the second pair of feeder hydraulic lines to the pair of branch lines, wherein each pair of branch lines has an accessory attached thereto;

c) positioning the flow diverter valve to direct fluid from the first one of the two feeder hydraulic lines to the branch hydraulic lines or to direct fluid from the second one of the two feeder hydraulic lines to the branch hydraulic lines; and d) providing the controller which, with the master control panel in the first position, for a particular motion or force imparted to the controller, controls fluid in the branch hydraulic lines and, with the master control panel in the second position, for a different motion or force imparted to the controller, controls fluid in the same branch hydraulic line.

31. The method according to claim 27, wherein the construction machine has a platform rotationally mounted about a base, a boom pivotally attached to the platform, and at least one additional member attached to the boom for performing work, further comprising the steps of:

a) wherein a distinct command from the controller is associated with a particular task and operates a hydraulic valve to direct pressurized hydraulic fluid through a hydraulic line to a first hydraulic terminal which controls a movement of the platform, boom or member attached thereto; and b) diverting flow in the hydraulic line downstream of the hydraulic valve to redirect the hydraulic fluid to a second hydraulic terminal, thereby reassigning the distinct command of the controller to a different task.

* * * * *

UNITED STATES PATENT AND TRADEMARK OFFICE

CERTIFICATE OF CORRECTION

PATENT NO. : 7,975,475 B2
APPLICATION NO. : 11/728969
DATED : July 12, 2011
INVENTOR(S) : John R. Ramun It is certified that error appears in the above-identified patent and that said Letters Patent is hereby corrected as shown below:

Column 17, Line 67, Claim 12, after “valves” insert -- , --

Column 20, Line 17, Claim 29, after “lines” insert -- , --

Column 20, Line 37, Claim 30, after “a” delete “the”

Signed and Sealed this
Fifteenth Day of November, 2011

David J. Kappos

David J. Kappos
*Director of the United States Patent and Trademark Office*